US012682305B2

(12) United States Patent
Duan et al.

(10) Patent No.: US 12,682,305 B2
(45) Date of Patent: Jul. 14, 2026

(54) METHOD OF ENGINEERING FORECAST AND ANALYSIS

(71) Applicant: HUAWEI TECHNOLOGIES CO., LTD., Shenzhen (CN)

(72) Inventors: Rong Duan, Shenzhen (CN); Yuan Yuan, Shenzhen (CN); Kangxing Hu, Shenzhen (CN); Chunxi Liu, Shenzhen (CN); Wenwen Huang, Shenzhen (CN); Wen Peng, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 131 days.

(21) Appl. No.: 18/505,850

(22) Filed: Nov. 9, 2023

(65) Prior Publication Data

US 2024/0070589 A1 Feb. 29, 2024

Related U.S. Application Data

(63) Continuation of application No. PCT/CN2022/079058, filed on Mar. 3, 2022.

(30) Foreign Application Priority Data

May 12, 2021 (CN) .......................... 202110519284.5

(51) Int. Cl.
*G06Q 10/06* (2023.01)
*G06Q 10/0637* (2023.01)

(52) U.S. Cl.
CPC .............................. *G06Q 10/06375* (2013.01)

(58) Field of Classification Search
CPC ...................................................... G06Q 10/06
See application file for complete search history.

(56) References Cited

U.S. PATENT DOCUMENTS

| | | | | |
|---|---|---|---|---|
| 10,366,346 | B2 * | 7/2019 | Achin ..................... | G06N 20/00 |
| 10,937,089 | B2 * | 3/2021 | Nandan .................. | G06N 20/00 |
| 2013/0151305 | A1 | 6/2013 | Akinola et al. | |
| 2019/0180358 | A1 * | 6/2019 | Nandan ............... | G06F 18/2113 |
| 2021/0182996 | A1 * | 6/2021 | Cella .................. | G06Q 10/0631 |
| 2024/0028989 | A1 * | 1/2024 | Hodges .................. | G06Q 10/04 |

FOREIGN PATENT DOCUMENTS

CA 3001304 C * 10/2021 ............. G06F 16/25

* cited by examiner

*Primary Examiner* — Kurtis Gills

(74) *Attorney, Agent, or Firm* — Leydig, Voit & Mayer, Ltd.

(57) ABSTRACT

A method of engineering forecast and analysis is provided. The method includes: generating a forecasting model based on financial or business information obtained through a user interface, where the forecasting model expresses a logical determining and/or calculation rule based on a structure of a high-order directed graph and by using a plurality of nodes, attributes of the plurality of nodes, and a relationship between every two of the plurality of nodes, and the forecasting model expresses a forecasting path through a directed edge between the nodes; and configuring a common attribute of the forecasting model, an attribute of the forecasting path, and a personalized attribute of the node based on instantiation configuration information.

19 Claims, 12 Drawing Sheets

Logic configuration

Logic
adjustment

Instance generation

Result
review

Parameter
adjustment

Instance
visualizing

Track
execution

METHOD OF ENGINEERING FORECAST AND ANALYSIS

CROSS-REFERENCE TO RELATED APPLICATIONS

This application is a continuation of International Application No. PCT/CN2022/079058, filed on Mar. 3, 2022, which claims priority to Chinese Patent Application No. 202110519284.5, filed on May 12, 2021. All of the aforementioned patent applications are hereby incorporated by reference in their entireties.

TECHNICAL FIELD

This application relates to the field of financial forecasting, and in particular, to a method of engineering forecast and analysis.

BACKGROUND

Financial forecasting is to forecast, by using systematic quantitative analysis technologies, a future financial status and operation level of an enterprise based on data generated by businesses and financial activities of the enterprise in a past period, external information from a macro market, competitors, and the like, and rules of an enterprise operation value chain. Purpose of the financial forecasting is to improve financial management in advance, forecast risks and quantify possible influence of the risks, and reduce uncertain in enterprise management. In this way, an expected target of a financial plan keeps pace with a changing external environment and economic conditions, and implementation effect of the financial plan is quantified in a timely manner. The financial forecasting is an important basis for enterprise management personnel to make improved management and scientific decisions.

For a complex enterprise with a plurality of product lines and a plurality of subsidiaries, enterprise business ranges, time spans for forecasting, and analysis cycle frequencies related to forecasting objects are different. In one aspect, a complete forecasting process usually includes a plurality of isolated systems. As a result, collaboration between related roles is time-consuming and labor-consuming, and forecasting models and expert experience accumulated during the forecasting process cannot be stored systematically. It is difficult to systematically manage enterprise financial forecasting knowledge and effectively combine the knowledge with enterprise business data to support knowledge accumulation and reuse.

In another aspect, traditional enterprises have long business processes, complex logical relationships, and complex financial rules. A traditional financial system emphasizes feasibility of the system. It is difficult for non-information technology (IT) professional to understand forecasting data because explainability of the obtained forecasting data is difficult to trace. In addition, it is difficult for experts to adjust information or logic in the system to integrate their own experience.

Enterprises have the following difficulties in constructing financial forecast and analysis systems: difficulties in continuous construction and maintenance due to integration of a plurality of data sources of business data and financial data, complex business logic and financial rules, and periodic updates and changes; difficulties in integration of expert estimations or high-precision forecasting, mutual validation in forecasting based on instances, and tests and simulation of different forecasting assumptions, and explanation of forecasting models; and difficulties in cross-business and multi-role collaborative forecasting. It is urgent to solve the above difficulties.

SUMMARY

To resolve the foregoing problem, embodiments of this application provide a method of engineering forecast and analysis. A method of engineering forecast and analysis is provided, to perform forecasting based on multi-knowledge fusion of financial data or business data. The method includes: generating a forecasting model based on financial or business information obtained through a user interface; where the forecasting model expresses a logical determining and/or calculation rule based on a structure of a high-order directed graph and by using a plurality of nodes, attributes of the plurality of nodes and a relationship between any two of the plurality of nodes, and expresses a forecasting path through a directed edge between the nodes; configuring a common attribute of the forecasting model, an attribute of the forecasting path, and a personalized attribute of the node based on instantiation configuration information, where the common attribute of the forecasting model is used to set a connection relationship between the forecasting model and a data source, an input table, and an output table; the attribute of the forecasting path is used to set a correspondence between the logical determining and/or calculation rule and data; and the personalized attribute of the node is used to set a forecasting object and a forecasting dimension that are expressed by each node; and converting, by a semantic parsing engine, the forecasting model and the instantiation configuration information into first computer-executable parsing code, where the first parsing code is used to: connect the forecasting model to the data source, the input table, and the output table in an engineering manner based on the common attribute of the forecasting model; execute, on the input table of the data source based on the forecasting path, the logical determining and calculation rule that is expressed by the forecasting model; and determine forecasting data that is of the forecasting object and that is expressed by each node in the forecasting dimension, and output the forecasting data to the output table or display the forecasting data on the user interface. In this way, a regular algorithm model can be effectively captured, and business logic and financial rules can be converted into computer-executable analysis code to apply to integrated data, so as to perform data forecast and analysis with supplementation of expert experience and analysis and estimation of professionals.

In a possible implementation, the forecasting path of the forecasting model includes a node relationship path, the node relationship path is a high-order directed graph in which the plurality of nodes are in a directed connection in a progressive manner layer by layer from bottom to top, and a same node is associated with a plurality of nodes at different levels. In this way, the forecasting path may be used to express a bottom-up progressive association relationship between nodes under a specific dimension configuration based on a financial forecasting rule.

In a possible implementation, the forecasting path of the forecasting model includes a dimension convergence path, where the dimension convergence path is a multi-way tree structure in which the plurality of nodes are connected according to a forecasting dimension convergence principle. In this way, the forecasting path may be used to express a bottom-up convergence association relationship based on dimensions such as a company business classification, customer management, or organization structure.

In a possible implementation, the forecasting path of the forecasting model includes a baseline conversion path, the baseline conversion path includes a plurality of layers of baselines, and each layer of baseline in the plurality of layers of baselines is a multi-way tree structure formed by the plurality of nodes. In this way, the forecasting path may be used to express a conversion relationship integrated with baseline information between indicators.

In a possible implementation, the generating a forecasting model based on financial or business information obtained through a user interface includes: invoking one or more forecasting models based on information input through the user interface. This implements cooperation between a plurality of forecasting models in a complex forecasting operation flow.

In a possible implementation, the generating a forecasting model based on financial or business information obtained through a user interface includes: invoking a template from a financial or business template library based on information in the user interface, where a structure of the template is the high-order directed graph; and determining, based on the template, the logical determining and calculation rule by defining the plurality of nodes, configuring the attributes of the plurality of nodes and the relationship between every two of the plurality of nodes, and determining the forecasting path based on a connection relationship between directed edges of the nodes, to generate the forecasting model. In this way, a user may store a high-order directed graph as a template for general use in future forecasting scenarios, and may further apply an existing template to newly generated business data, to form a positive iterative cycle of enterprise financial forecasting knowledge.

In a possible implementation, the generating a forecasting model based on financial or business information obtained through a user interface includes: selecting a plurality of nodes from an indicator library and/or baseline library based on the information obtained through the user interface; and; determining, based on the financial or business information obtained through the user interface, the logical determining and calculation rule by defining the plurality of nodes, configuring the attributes of the plurality of nodes and the relationship between every two of the plurality of nodes, and determining the forecasting path by connecting the directed edges of the plurality of nodes, to generate the forecasting model. In this way, the user may create a personalized template, and may further store a high-order directed graph as a template for general use in a future forecasting scenario.

In a possible implementation, the determining the logical determining and calculation rule by defining the plurality of nodes, configuring the attributes of the plurality of nodes and the relationship between every two of the plurality of nodes includes: determining the logical determining and calculation rule by defining the forecasting object, a step size/frequency, a dimension, and an analysis granularity of the node, configuring an adjustment attribute, a calculation sequence attribute, a forecasting object type, and a forecasting limit of the node, and setting an arrow direction of the directed edge between the nodes. In this way, the user is enabled to effectively capture a rule-based algorithm model and express business logic and financial rules through the forecasting model.

In a possible implementation, the personalized attribute of the node is further used to set an adjustment attribute, a calculation sequence attribute, a forecasting object type, and a forecasting limit of the node. This helps implement personalized configuration of the forecasting model.

In a possible implementation, the adjustment attribute of the node includes an adjustable or non-adjustable mode; the calculation sequence attribute of the node includes a sequence of performing logical determining by the node or a sequence of performing calculation by the node; the forecasting object type of the node includes a calculation-type node, a condition determining-type node, an information-type node, and an algorithm-type node; and the forecasting limit of the node includes a value range of a parameter. This helps optimize and adjust the forecasting model based on expert experience and analysis and estimation of professionals.

In a possible implementation, the configuring a common attribute of the forecasting model based on the obtained instantiation configuration information includes: setting, based on the obtained instantiation configuration information, a connection relationship between the forecasting model and a data source, an input table, and an output table that are local; or setting, based on the obtained instantiation configuration information, a connection relationship between the forecasting model and a data source, an input table, and an output table that are remotely invoked. In this way, connections between different forecasting rules, instance data, forecasting models, and forecasting objects can be implemented, to improve operability of generating a forecasting model, explainability of a forecasting process, and a quick generalization capability of the forecasting model.

In a possible implementation, the converting, by a semantic parsing engine, the forecasting model and the instantiation configuration information into computer-executable parsing code includes: converting the forecasting model and the instantiation configuration information into the computer-executable parsing code by using a javascript object notation (JSON) or extensible markup language (XML) semantic parsing engine. In this way, the forecasting model can be connected to the input table and the output table of the data source in an engineering manner based on the common attribute of the forecasting model.

In a possible implementation, the data source includes one of or a combination of a financial database, a business database, a baseline database, a dimension database, and an external database. In this way, a large amount of data from a plurality of systems can be provided for enterprises to construct a financial forecasting system, and data related to enterprise business activities and financial status can be integrated across systems.

In a possible implementation, the method further includes: adjusting the common attribute of the forecasting model, the attribute of the forecasting path, and the personalized attribute of the node based on the data information obtained through the user interface, to determine a forecasting model that meets a forecasting requirement. This helps optimize and adjust the forecasting model with assistance of expert experience and analysis and estimation of operators.

In a possible implementation, the determining a forecasting model that meets a forecasting requirement includes: displaying, through the user interface, a forecasting data change rate that is of each node and that is affected by adjustment, and determining, based on the forecasting data that is of the forecasting object and that is expressed by each node in the forecasting dimension, the forecasting model that meets a forecasting requirement. In this way, a logical determining and calculation process of the forecasting model linked to the instance data can be intuitively presented, a forecasting result can be presented, and a forecasting model that meets a forecasting requirement can be obtained based on the process and the forecasting result.

In a possible implementation, the method further includes: generating a first forecasting model based on the financial or business information obtained through the user interface; configuring a common attribute of the first forecasting model, an attribute of a first forecasting path, and a personalized attribute of a first node based on obtained first instantiation configuration information, and determining a first calculation rule;

generating a second forecasting model based on the financial or business information obtained through the user interface; configuring a common attribute of the second forecasting model, an attribute of a second forecasting path, and a personalized attribute of a second node based on obtained second instantiation configuration information, and determining a second calculation rule; configuring a linkage relationship between the first calculation rule and the second calculation rule; and converting, by the semantic parsing engine, the first forecasting model and the second forecasting model, the first instantiation configuration information and the second instantiation configuration information, and the linkage relationship between the first calculation rule and the second calculation rule into second computer-executable parsing code, where the second parsing code is used to sequentially connect the first forecasting model and the second forecasting model based on the linkage relationship between the first calculation rule and the second calculation rule, to generate a forecasting operation flow. In this way, a plurality of forecasting models can be integrated to construct a forecasting operation flow and implement cooperation between a plurality of nodes in a complex forecasting operation flow.

In a possible implementation, the first forecasting model is configured with the second calculation rule and/or third calculation rule, and the second forecasting model is configured with the first calculation rule and/or fourth calculation rule. In this way, one or more forecasting rules can be configured based on a complexity degree of a forecasting model of each node.

In a possible implementation, the generating a forecasting model based on the financial or business information obtained through a user interface includes: connecting the forecasting model to an output interface of a trained algorithm model to invoke the algorithm model in real time, and combining the algorithm model with the financial or business information obtained through the user interface, to generate a forecasting model. In this way, knowledge can be learned from forecasting data more efficiently, to improve algorithm learning efficiency, and improve algorithm forecasting quality by using well-founded knowledge.

In a possible implementation, the method further includes: configuring permission for the forecasting model, where the permission includes permission for a baseline node in the forecasting model, permission for each forecasting path in the forecasting model and permission for a forecasting result corresponding to the forecasting path. In this way, requirements for timeliness of financial forecasting can be met, flexible configuration can be implemented for management and control of time-based operation permission, and a permission configuration unit that can be defined based on a requirement is provided for complex permission configuration.

For a complex enterprise with a plurality of product lines and a plurality of subsidiaries, according to embodiments of this application, knowledge and data accumulated in a forecasting process can be quickly and efficiently reused, and expert experience can be flexibly integrated into business forecast and analysis, and the expert experience is verified, to implement engineering of financial forecasting.

BRIEF DESCRIPTION OF DRAWINGS

To describe embodiments of this disclosure, the following describes the accompanying drawings for describing embodiments. The accompanying drawings in the following descriptions show merely exemplary embodiments of this disclosure, and a person of ordinary skill in the art may still derive other drawings from these accompanying drawings without creative efforts.

The following describes the accompanying drawings that need to be used in the descriptions of embodiments or a conventional technology.

FIG. 4c is a reverse model diagram of type ② in FIG. 4a;

DESCRIPTION OF EMBODIMENTS

Figure 1:
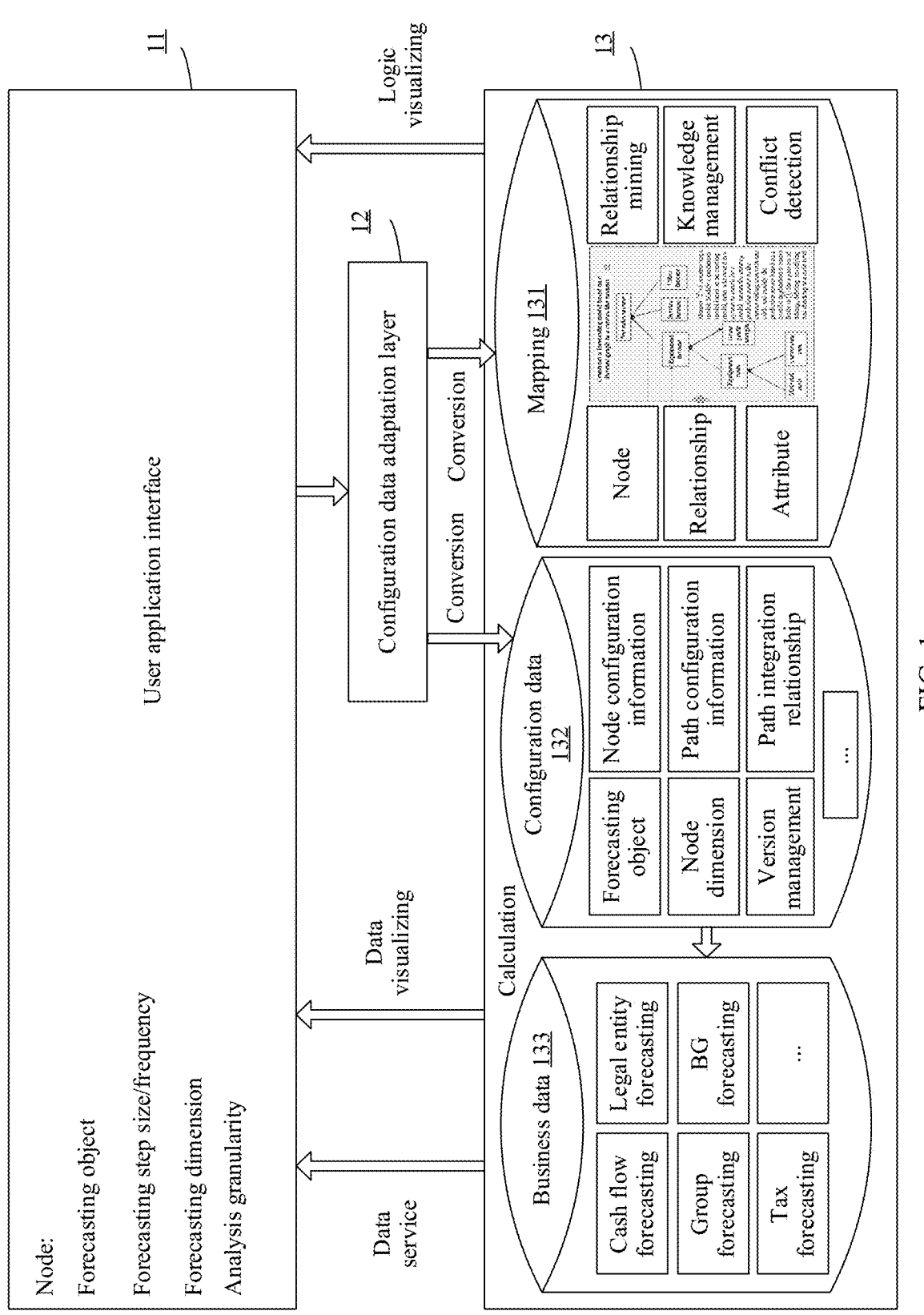
FIG. 1 is a system architecture diagram of a method of engineering forecast and analysis according to an embodiment of this application.

Financial indicators refer to quantitative indicators used by an enterprise to summarize and evaluate financial status and operating results of the enterprise. Financial indicators involve funding activities related to enterprise business activities and are often used in various phases of enterprise funding, operation, and risk management. As basic components of constructing a forecasting model, financial indicators have form characteristics of finance, and can be used as relationship nodes to connect all aspects of enterprise business activities, reveal linkage between enterprise business activities and financial results, and reflect essence of enterprise economic activities. Financial indicators usually used by enterprises are divided into profit and loss, operating assets and a cash flow, which respectively reflect profitability, solvency and operating ability of the enterprise.

In a first solution, a method for forecasting an enterprise financial index of a fund amount is proposed. In this method, transaction data and auxiliary data of a cash center are obtained, and feature extraction is performed on the transaction data and auxiliary data to obtain characteristic data; the characteristic data is input into a plurality of pre-trained forecasting models that are single to obtain corresponding forecasting values; and a non-dominant ranking genetic algorithm with an elite strategy is used to process the forecasting values of the forecasting models that are single to obtain a cash inventory usage forecasting result. The single forecasting model is classified into a ridge regression model, a classification and regression tree model, an extremely randomized regression tree model, a light gradient-boosting machine (LightGBM) regression model, or a convolutional neural network model. This solution builds a model based on data and searches for rules from the data for forecasting. However, there is no integration solution for financial knowledge and business knowledge related to forecasting, and the data-driven explainability is low.

In a second solution, a method of generating a forecasting model of corporate financial indicators is proposed. The method gives weight to accuracy of historical forecast of a single institution or person based on an integrated manner, to form a final result. In this solution, for a predetermined time period, historical forecasting data generated by a plurality of institution personnel for corporate financial indicators corresponding to one or more financial products is obtained, and actual data for the corporate financial indicators is obtained, and the plurality of institution personnel are associated with a plurality of institutions; the historical forecasting data and the actual data are filtered; and the plurality of institution personnel and the plurality of institutions are scored based on the filtered historical forecasting data and the actual data. When forecasting results generated by the plurality of institution personnel for each of the one or more financial products are used as a combined forecasting model, a corresponding weight is determined based on scoring results of the plurality of institutions and the plurality of institution personnel, to forecast the corporate financial indicators. This method comprehensively scores personal knowledge based on historical data, and dynamically adjusts the weight of the combined forecasting model based on forecasting results released by different institution personnel to forecast corporate financial indicators more accurately. However, this solution only integrates the forecasting results and does not involve integration of different knowledge and experience.

When constructing a financial forecasting system, an enterprise needs to integrate a large amount of data from a plurality of systems, design and develop an algorithm model that can effectively capture rules, convert business logic and financial rules into computer-executable parsing code, and apply the code to integrated data, so as to perform data forecast and analysis with supplementation of expert experience and analysis and estimation of professionals. This process is related to plenty of professional knowledge in enterprise business, financial management, and IT fields and IT skills, and needs to evolve with development of enterprise business and external environment changes. A financial forecasting chain of the enterprise is complex and changeable. If knowledge and experience cannot be accumulated in each link, and linkage between links, and real-time application, analysis, and conversion cannot be implemented, requirements of increasingly refined management cannot be met.

The following describes a method of engineering forecast and analysis according to an embodiment of this application.

As one of key manners of enterprise management, financial forecasting runs through every important link of a value chain of enterprise activities. In an enterprise, forecasting can be performed in the following ways: ① Identify a parent node (Leading Indicator) and then perform forecasting based on a complex logical relationship between the parent node and business or finance. ② Separately forecast based on each sub-department/sub-product and consolidate the forecast. ③ Based on historical data, use big data technologies such as statistical analysis and machine learning to implement algorithm modeling for forecasting. In an actual application scenario of enterprise forecasting, the foregoing multiple manners may be used to perform mutual verification. Based on the foregoing forecasting forms, a forecasting object needs to integrate data related to enterprise business activities and financial status across systems, sort out business logic and financial rules that meet business essence, and IT professional implement corresponding parsing code or build an algorithm model based on the data to perform engineering forecasting analysis. In actual work, a final forecasting result should be supplemented by expert estimation or adjustment.

In the method of engineering forecast and analysis provided in this embodiment of this application, a layered decoupling mode is used, so that a forecasting rule is decoupled from a forecasting object of an instance, and the forecasting rule may be reused. A forecasting rule is logical determining for performing data analysis and/or a calculation rule for performing data calculation. Optionally, the forecasting rule may alternatively be an algorithm implemented based on historical data by using a big data technology such as statistical analysis and machine learning.

Decoupling is a state of an IT environment in which two or more models or components work or connect in a specific manner without direct connection. A forecasting rule and a forecasting object are not directly related. A forecasting rule can be applied to forecasting objects of different instances.

In some application scenarios, forecasting rules of a complex enterprise may be corresponding to different instance data based on scope of a forecasting object, but forecasting rules used in a forecasting process are the same. For example, an income item of an enterprise is used as a forecasting object, and a forecasting rule of the income item is: income=Product price×Quantity, and Quantity=Product demand order. Instance data corresponding to the forecasting object "income" is "product price", "quantity", and "product demand order". Forecasting rules of the forecasting object "income" are the same for product types. Different product lines are corresponding to different instance data. For example, different products are corresponding to different price data and demand order data.

According to the method of engineering forecast and analysis provided in this embodiment of this application, a forecasting rule is template-based, a plurality of types of forecasting templates are abstracted based on a plurality of forecasting paths, and the templates are combined or edited, to construct a forecasting model for a business problem.

According to the method of engineering forecast and analysis provided in this embodiment of this application, instance configuration is performed on forecasting models of various types, and executable code corresponding to the forecasting model is generated by using a configuration-based interaction design.

According to the method of engineering forecast and analysis provided in this embodiment of this application, based on the foregoing engineering capability, a complex forecasting model can be constructed across types, and engineering forecast and analysis of data and knowledge is performed by using different logical determining and/or calculation rules. Forecasting results may be mutually verified on different instances.

To flexibly adapt to different business and/or financial forecasting rules, according to the method of engineering forecast and analysis provided in this embodiment of this application, a forecasting model is constructed by using an interactive user interface. A forecasting rule, data, and an algorithm are connected, and various types of forecasting models are constructed and released. Business experts may adjust the forecasting model at any node in the forecasting process based on business experience of the business expert. A background semantic parsing engine generates computer-executable parsing code based on the forecasting model adjusted by the business expert, and performs related logic determining and/or calculation, to perform data forecasting analysis.

In a possible implementation, first, a business personnel load, through an interactive user interface, a template that expresses a business and/or financial forecasting rule, constructs a forecasting model in a form of a high-order directed graph, and determines a logic determining and calculation rule related to the model; and then, an IT professional performs configuration-based integration of related instance data and a forecasting dimension at each node level based on a granularity requirement of business and/or financial analysis. Then, a background parsing engine integrates the constructed forecasting model with configuration information input by the IT professional and converts the model and the information into computer-executable parsing code, and corresponding calculation is performed based on a related database through an application programming interface (API) based on the logic determining and calculation rule to perform data forecast and analysis.

For example, the template is an expression form of a forecasting rule that is abstracted based on business and/or financial knowledge accumulated by an enterprise, and is stored in a template library, an indicator library, a baseline library, or an algorithm library of a forecasting model management platform for business and/or financial data of the enterprise. The expression form of the template includes a high-order directed graph or a multi-layer tree graph. Analysis granularity refers to a degree of detail for business and/or financial analysis scope in a forecasting scenario. For example, the analysis granularity from coarse to fine (from large to small) may be divided into levels such as group-subsidiary, group-subsidiary-production workshop, group-subsidiary-production workshop-product line, and production workshop-product line-product model.

A forecasting dimension is a level of detail of a data layer for business and/or financial analysis performed under a forecasting scenario. For example, the forecasting dimensions are classified from low to high based on data. The forecasting dimensions are set and adjusted for a forecast product, a forecast customer, a forecast account, a node, a forecast region, a forecast type, a currency, and the like.

The forecasting model is based on a structure of a high-order directed graph. A logical determining and/or calculation rule is expressed by using a plurality of nodes, attributes of the plurality of nodes, and a relationship between every two of the plurality of nodes, and a forecasting path is expressed by using a directed edge between the nodes. The forecasting model can reflect a forecasting process of logical determining and calculation based on instance data, and can clearly display a forecasting result. The forecasting model may include a plurality of forecasting paths, to perform different logical determining and calculation on different instance data.

A forecasting path refers to a process from input information integration to forecasting result generation for a forecasting object. For a complex enterprise, this process includes defining a forecasting object, integrating related data, construct a model, and setting a forecasting dimension. Definition of the forecasting object should specify an enterprise business scope related to the forecasting object, a time span for forecasting, and an analysis cycle frequency.

Constructing a forecasting model is mainly to determine a forecasting path that includes a forecasting path based on a progressive relationship between indicators, a forecasting path based on convergence of enterprise architecture dimensions, and a forecasting path converted from a baseline. In actual application scenarios of enterprise forecasting, modeling of a forecasting model usually includes the combined modeling of the preceding three forecasting paths.

A business expert can adjust a key node of the forecasting model based on experience of the business expert, which is finally stored as knowledge after verification, used for a business and/or financial forecasting scenario and stored in a background instance graph database in a form of a high-order directed graph to support verification, search, and deduction of the forecasting path.

According to the method of engineering forecast and analysis provided in this embodiment of this application, invoking and configuration-based integration between different forecasting models are provided by using a multi-knowledge representation technology.

The following describes the technical solutions in embodiments of this application with reference to the accompanying drawings in embodiments of this application.

FIG. 1 is a system architecture diagram of a method of engineering forecast and analysis according to an embodiment of this application. As shown in FIG. 1, a system architecture of a method of engineering forecast and analysis provided in this embodiment of this application includes an application layer 11, a data adaptation layer 12, and a knowledge management layer 13.

The application layer 11 generates a forecasting model based on financial or business information obtained through a user interface, where the forecasting model expresses a logical determining and/or calculation rule based on a structure of a high-order directed graph and by using a plurality of nodes, attributes of the plurality of nodes, and a relationship between every two of the plurality of nodes, and expresses a forecasting path by using a directed edge between the nodes; and displays a forecasting result of a forecasting object.

For example, different forecasting objects, forecasting step sizes/frequencies, forecasting dimensions, and analysis granularities may be defined for each node.

The data adaptation layer 12 is configured to perform adaptation of a forecasting rule and data for an application scenario, and perform formatting configuration conversion of a forecasting object, a relationship between forecasting objects, and a corresponding logical determining and calculation rule by using a semantic parsing engine technology. The formatting configuration conversion can be performed online or offline.

For example, a semantic parsing engine technology may be used to perform formatting configuration and conversion for a remotely invoked forecasting model and/or forecasting instance online, or may alternatively perform formatting configuration and conversion for a locally invoked forecasting model and/or forecasting offline.

Optionally, the semantic parsing engine may be a JSON (javascript object notation). JSON is a lightweight data exchange language, uses a text format completely independent of a program language, and also uses a habit of C language, including C, C++, C #, Java, javascript, perl, python, and the like, so that a processor performs formatting configuration conversion for a node, a relationship between nodes, and a corresponding logical determining and calculation rule.

Optionally, the semantic parsing engine may be XML (extensible markup language), and XML is an extensible markup language, is a cross-platform content-dependent technology in an Internet environment, and is a powerful tool for processing structured document information currently. The XML uses a series of simple marks to perform formatting configuration of the node, the relationship between nodes, and the logic determining and calculation rule data.

It should be noted that a business template or financial template for perform formatting configuration by using IT technologies such as JSON and XML is easy to be parsed and generated by a machine, and supports cross-platform invoking in the Internet environment.

The knowledge management layer 13 includes a graph library 131, a configuration database 132, and a business database 133, and is used to store and manage graphs, configuration data, and business data.

Specifically, the graph library 131 is used to store a forecasting model that is configured and converted by the data adaptation layer 12, including a high-order directed graph, a plurality of formatted nodes on the graph, attributes of the plurality of nodes, and a relationship between every two of the plurality of nodes, perform knowledge management, and provide template support for relationship mining, forecasting model construction, knowledge reasoning, conflict detection, and correlation calculation of the forecasting object.

The configuration database 132 is used to store and manage, in a form of relational data, instantiation configuration data, for example, dimension data, metadata, and data related to defining a forecasting model and a forecasting instance, on which the data adaptation layer 12 performs configuration and conversion. The instantiation configuration data includes a type of a forecasting node, a common attribute of a forecasting model, an attribute of a forecasting path, a personalized attribute of a node, and the like. The common attribute of the forecasting model is used to set a connection relationship between the forecasting model and a data source, an input table, and an output table. The attribute of the forecasting path is used to set a process relationship between a logic determining and/or calculation rule and data. The personalized attribute of the node is used to set a forecasting object and a forecasting dimension expressed by each node.

For example, configuration data such as a forecasting object, a node dimension, version management, node configuration information, path configuration information, and a path integration relationship may be determined at the application layer 11 by defining a node. The configuration data is stored in the configuration database 132 after being converted at the configuration data adaptation layer 12. The background parsing engine converts the configuration data into computer-executable parsing code, and is connected to the business database 133 through an API interface.

The business database 133 is used to store and manage data sources of enterprise finance or business in the form of relational data. The data provides related data for instantiation calculation of cash forecast, group forecast, legal entity forecast, tax forecast, bunge limited (BG) forecast, and the like, and includes an input table formed by data of the data sources and an output table formed by forecasting result data.

The foregoing parsing code is executed on a related data source through an API interface, so that the forecasting model can be connected to the input table and the output table of the data source in an engineering manner based on the common attribute of the forecasting model; the logic determining and calculation rule that is expressed by the forecasting model is executed on the input table of the data source based on a forecasting path sequence; forecasting data of a forecasting object expressed by each node in a forecasting dimension is determined, and forecasting result data is output to the output table or displayed on a user interface of the application layer 11, and a data service for optimizing and adjusting the forecasting model is provided.

For example, the data source includes a BG database, a group database, a tax database, a cash database, a legal entity database, and the like.

For example, forecasting objects in different forecasting dimensions include BG forecasting, group forecasting, tax forecasting, cash flow forecasting, and legal entity forecasting.

For example, the output table includes a BG forecasting output table, a group forecasting output table, a tax forecasting output table, a cash flow forecasting output table, and a legal entity forecasting output table.

This embodiment of this application provides a layered decoupling design mode, to decouple a template (the application layer) from a forecasting rule (the graph library 131), decouple execution code (the configuration database 132) of the forecasting rule (the graph library 131) from a database (the business database 133), and decouple automatic generation of forecasting path (the data adaptation layer 12) from adjustment of an operator. The decoupling design enables a template to be reused during forecasting model construction. Model construction personnel can adjust an existing model, greatly improving work efficiency. The decoupling design allows the parsing code of the forecasting model to be invoked by different forecasting applications and executed in a corresponding database.

Figure 2:
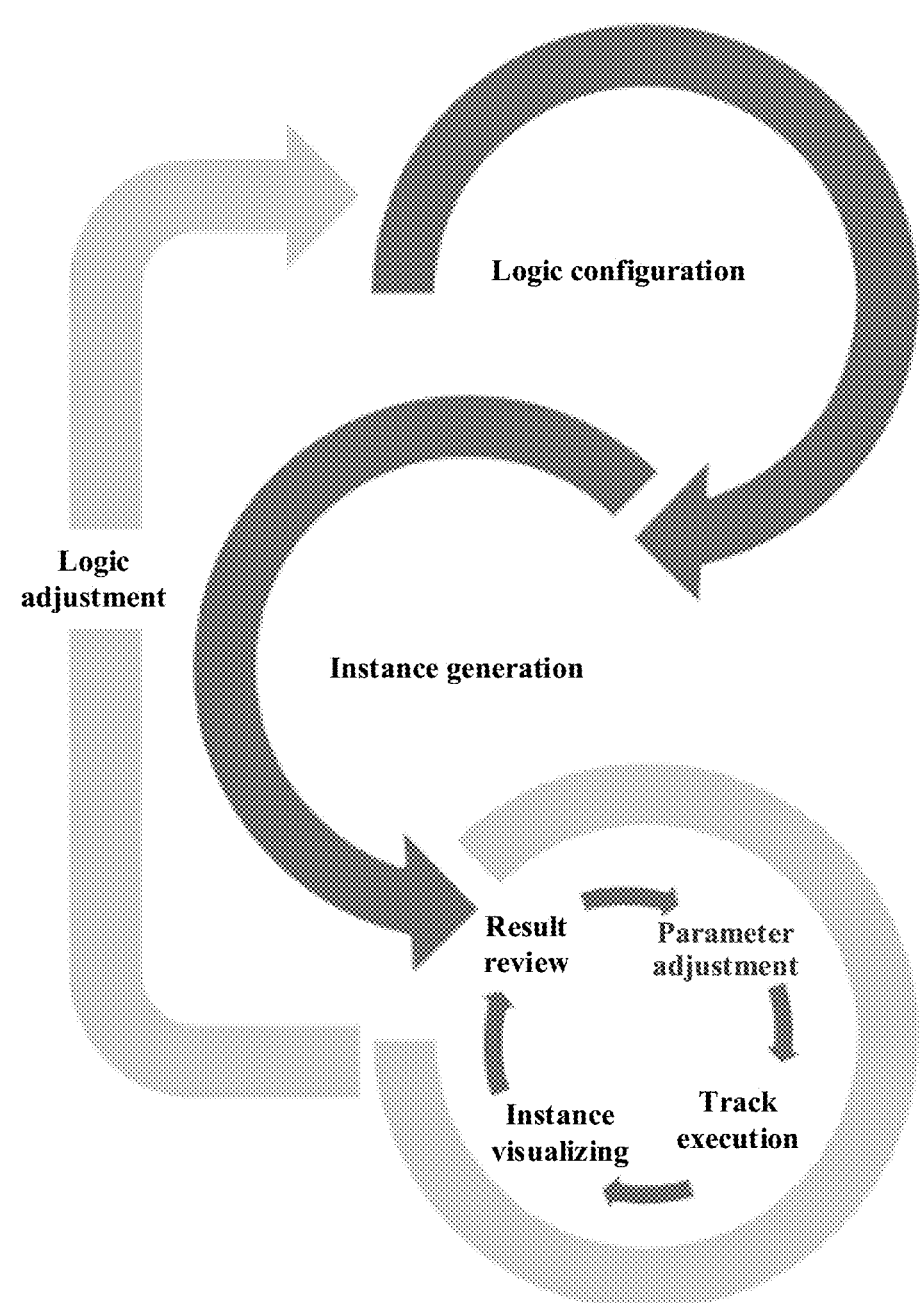
FIG. 2 is a schematic diagram of a layered decoupling architecture of a method of engineering forecast and analysis according to an embodiment of this application.

FIG. 2 is a schematic diagram of a layered decoupling architecture used in a method of engineering forecast and analysis based on a multi-knowledge representation technology according to an embodiment of this application. As shown in FIG. 2, a forecasting rule and a forecasting path expressed by a forecasting model are logically configured based on a multi-knowledge representation technology, and a model instance is generated by integrating instance data. A business expert reviews the forecasting path and a forecasting result, and adjusts a parameter of a model instance based on experience estimation of the business expert. A background parsing engine converts the model instance into computer-executable parsing code, executes an adjusted forecasting model on a data source, and displays and stores a forecasting result, an adjusted instance model, and an adjusted logic configuration. This method implements connection between different forecasting rules, instance data, forecasting models, and forecasting objects, and improves operability of forecasting model generation, explainability of a forecasting process, and a fast generalization capability of the forecasting model.

Figure 3:
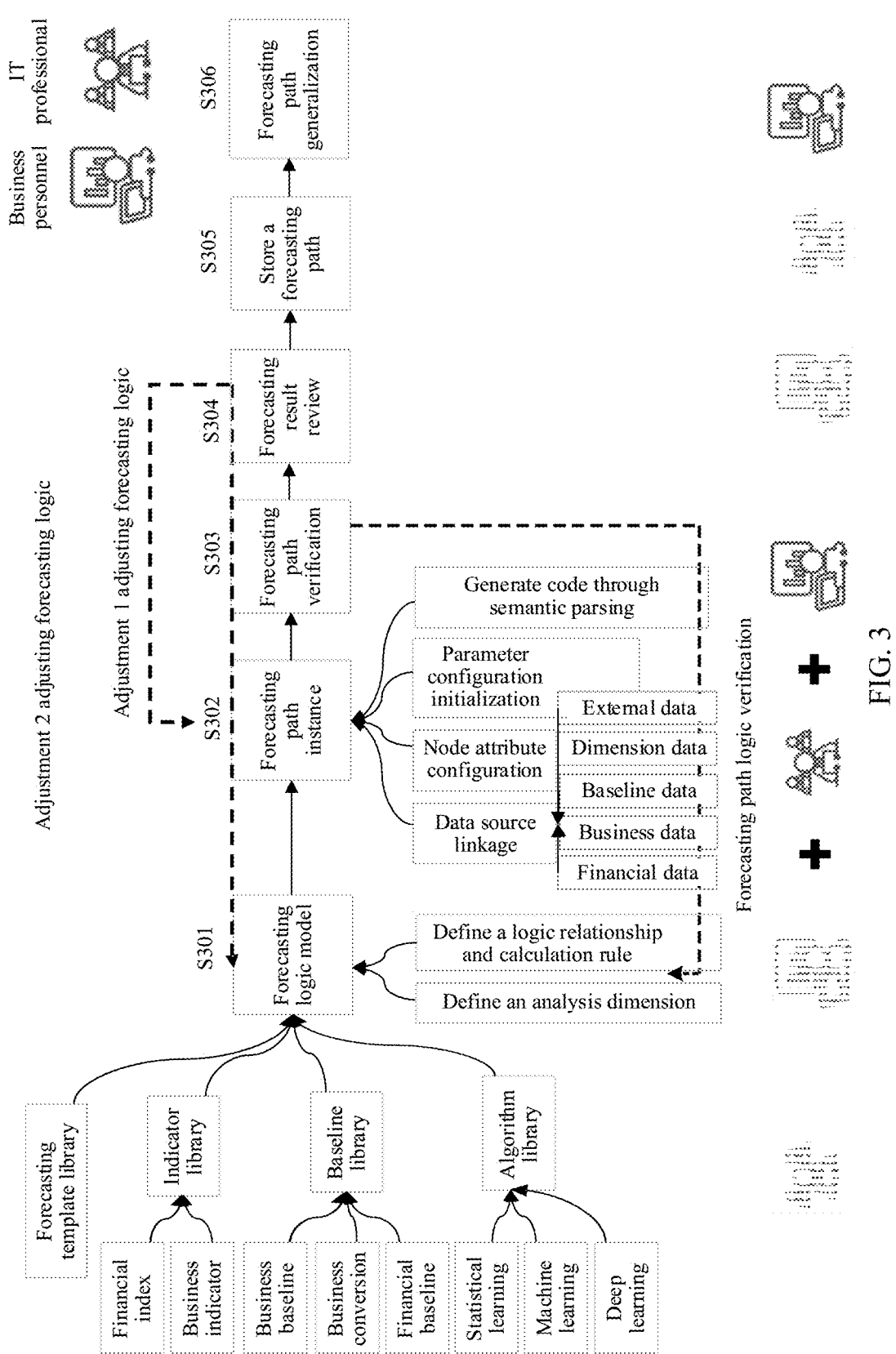
FIG. 3 is a flowchart of a method of engineering forecast and analysis according to an embodiment of this application.

FIG. 3 is a flowchart based on a method of engineering forecast and analysis according to an embodiment of this application. As shown in FIG. 3, exemplary steps of the method of engineering forecast and analysis provided in this embodiment of this application include the following steps.

S301: Obtain a template through an application interface, edit a plurality of nodes based on the template, and define a forecasting dimension of each of the plurality of nodes, a relationship between nodes, and a corresponding logical determining and calculation rule.

In a possible implementation, S301 is implemented by performing the following steps S3011 to S3012.

S3011: Obtain, through the application interface, a template loaded by a user through a user interface.

For example, the processor loads the template from a forecasting template library, an indicator library, a baseline library, and an algorithm library through an input of the user on the user interface. For example, a financial indicator template and/or a business indicator template are loaded by using the indicator library; a business baseline template, a business conversion template, and/or a financial baseline template are loaded by using the baseline library; and a statistics learning template, a machine learning template, and/or a deep learning template are loaded by using the algorithm library.

The template library is set in a graph library 131, and the indicator library, the baseline library, and the algorithm library are set in a configuration database 132.

S3012: Obtain configuration information of each node in the template based on input data of the user, determine a business scope, a forecasting object, a forecasting step size/frequency, and a forecasting dimension of each node based on the configuration information, and configure a relationship between nodes in the plurality of nodes, and a corresponding logical determining and calculation rule.

For example, the processor obtains, through the application interface, configuration information such as a node defined by the user through the user interface, a relationship between nodes, and a corresponding logical determining and calculation rule, and constructs a forecasting model based on the configuration information. The defined node includes a business scope, a forecasting object, forecasting step size/frequency, and a forecasting dimension of each node.

S302: Configure an initialization parameter based on the template, configure attributes of the plurality of nodes, configure data source link information, determine a forecasting path, and generate a forecasting model; and translate the forecasting path into computer-executable parsing code by a semantic parsing engine, to link the forecasting path to the data source.

For example, a common attribute of the forecasting model, an attribute of the forecasting path, and a personalized attribute of the node may be configured based on instantiation configuration information.

The semantic parsing engine converts the forecasting model and the instantiation configuration information into first computer-executable parsing code.

In a possible implementation, S302 is implemented by performing the following steps S3021 to S3023.

S3021: Configure an initialization parameter based on the input data of the user. For example, the initialization parameter includes initial values of information such as a forecasting step size/frequency, a forecasting dimension, and an analysis granularity.

S3022: Configure personalized attributes of a plurality of nodes based on input data of a user. For example, the personalized attribute of the node includes at least setting a forecasting object, a forecasting dimension, a node adjustment enabling attribute, and an information limitation attribute of each node.

S3023: Configure the data source link information, determine the forecasting path, and generate the forecasting model. For example, the data source link information is the common attribute of the forecasting model, and includes setting a connection relationship between the data source, an input table, and an output table. The determining the forecasting path includes determining a correspondence between the logical determining and/or calculation rule and data.

S3024: Parse the forecasting model into computer-executable parsing code by using the parsing engine, and establish a link between the computer-executable parsing code and the data source through an API interface. For example, a multi-dimensional data source linked to such as a financial database, a business database, a baseline database, a dimension database, and an external database is established by using the computer-executable parsing code.

For example, the parsing code is used to connect the forecasting model to the data source, an input table, and an output table based on the common attribute of the forecasting model in an engineering manner.

S303: Run, on the data source, the computer-executable parsing code, and perform a check and operation on the forecasting path to perform data forecasting analysis.

In a possible implementation, the processor may check and parse the configured forecasting model by using a parsing engine of the processor, to generate executable parsing code; connect the computer-executable parsing code to a corresponding data source through an API; and execute the parsing code on the data source for the forecasting object, to perform data forecasting analysis.

For example, when the computer-executable parsing code is run in the input table of the data source, the processor executes, based on the forecasting path, the logical determining and calculation rule that is expressed by the forecasting model; determines forecasting data of a forecasting object that is expressed by each node in a forecasting dimension; and outputs the forecasting data to the output table or displays the forecasting data on the user interface.

S304: Review a forecasting result, adjust the node attribute and the forecasting path, and optimize the forecasting model.

In a possible implementation, S304 is implemented by performing the following steps:

S3041: The user reviews, based on professional knowledge, the forecasting result displayed on the user interface, and if a review result is that the forecasting result is unreasonable, performs S3042. If the review result is that the forecasting result is reasonable, the process ends.

S3042: Adjust the configuration information of the forecasting model, generate computer-executable parsing code by using the adjusted forecasting model by using the parsing engine, and input the computer-executable parsing code into the data source by using the API interface; and execute the parsing code on the data source, to perform data forecasting analysis for forecasting objects in different forecasting dimensions.

For example, the adjusting the configuration information of the forecasting model includes adjusting one or more of information values such as a forecasting step size/frequency, a forecasting dimension, and/or an analysis granularity.

For example, the adjusting the configuration information of the forecasting model includes adjusting the forecasting object of the node, the enable adjustment attribute of the node, and/or the configuration information limitation attribute.

For example, the adjusting the configuration information of the forecasting model includes: adjusting the forecasting path, resetting the connection relationship between the forecasting path and the data source, the input table, and the output table, and reconfiguring the correspondence between the logical determining and/or calculation rule and data.

S3043: The user reviews and checks, based on professional knowledge, the forecasting result displayed on the user interface, and if a review result is that the forecasting result is unreasonable, performs S301. If the review result is that the forecasting result is reasonable, the process ends.

S305: Store the forecasting model.

S306: Invoke a forecasting model as a service, and combine a plurality of forecasting models or combine a forecasting model and another application for invoking.

Figure 4A:
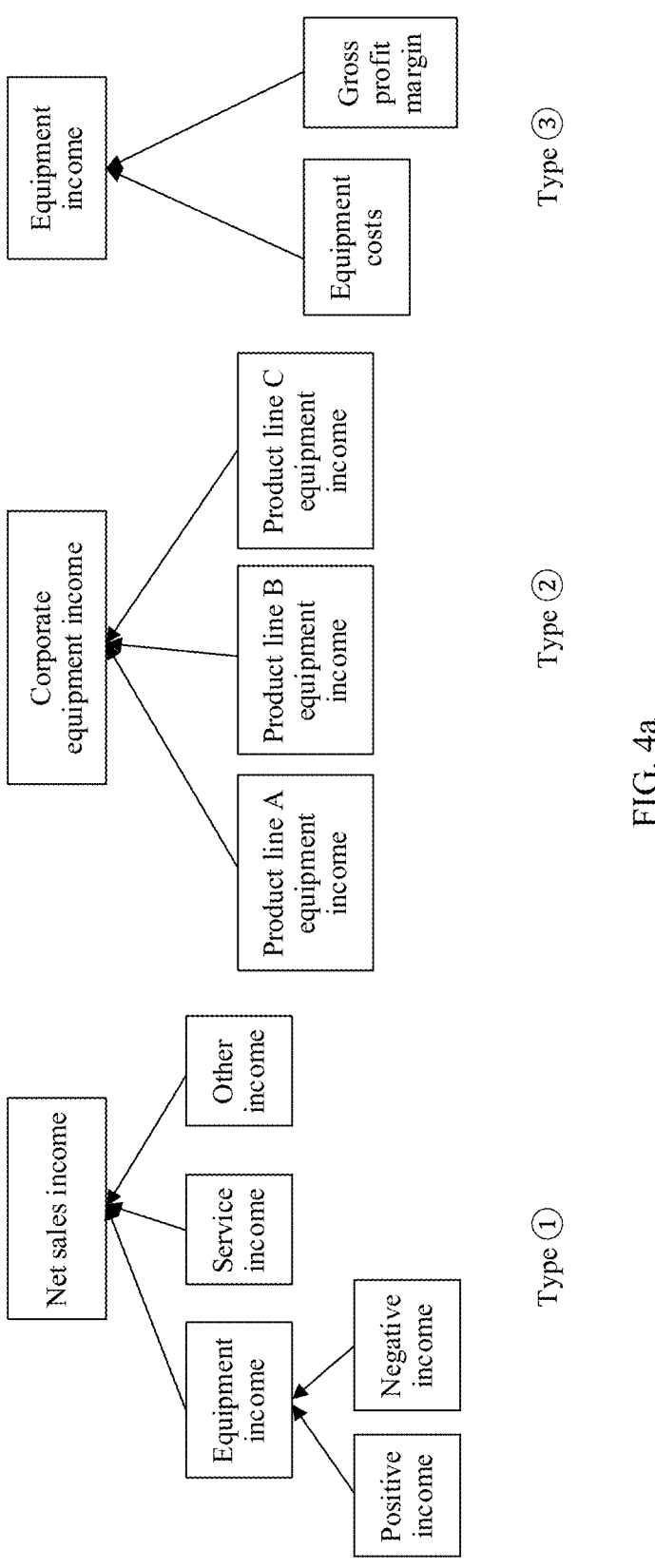
FIG. 4a is a schematic diagram of three forecasting paths of a method of engineering forecast and analysis according to an embodiment of this application.

In a possible implementation, the forecasting path includes a first-type path, and the first-type path is a node relationship type. The path represents an association relationship between nodes in a specific dimension configuration, and is usually a directed graph structure that is formed by a plurality of nodes and that is progressive layer by layer from bottom to top. A same node may be associated with a plurality of other nodes at different levels. As shown in a type ① in FIG. 4a, the structure of the directed graph is based on a financial forecasting rule, and a lower-layer node of the directed graph is a business activity-type indicator, for example, positive income and negative income; and an upper-layer node is a financial management-type indicator, for example, equipment income data, service income data, and other income data. The equipment income data is obtained by calculating data of the positive income and negative income. Further, net sales income forecasting is implemented by summing up the equipment income data, service income data, and other income data.

In a possible implementation, the forecasting path includes a second type of path, and the second type of path is a dimension convergence type. The path is a bottom-up convergence association relationship of a node based on dimensions such as a company business classification, customer management, or an organization structure, and is usually a multi-way tree structure of a plurality of nodes. The multi-way tree structure may be parsed from dimension data related to an enterprise product, a customer, and an organization. As shown in a type ② in FIG. 4a, equipment income forecasting of the company is based on a product line. Income forecasting data of each product line is converged to the equipment income forecasting of the company. For example, equipment income forecasting data of a product line A, equipment income forecasting data of a product line B, and an equipment income forecasting data of a product line C are summed up to obtain an equipment income forecasting result of the company.

In a possible implementation, the forecasting path includes a third type of path, the third type of path is a baseline conversion type, and the path is a conversion relationship of integrated baseline information between indicators, and is mostly a binary or multi-way tree structure. For example, the multi-way tree structure is a multi-layer data structure that is converted for a plurality of times in a layered manner, and the multi-way tree structure may be obtained by converting a single-layer tree structure for a plurality of times. As shown in type ③ in FIG. 4a, this type is expressed by conversion of equipment cost to equipment income through a gross profit margin baseline.

Figure 4B:
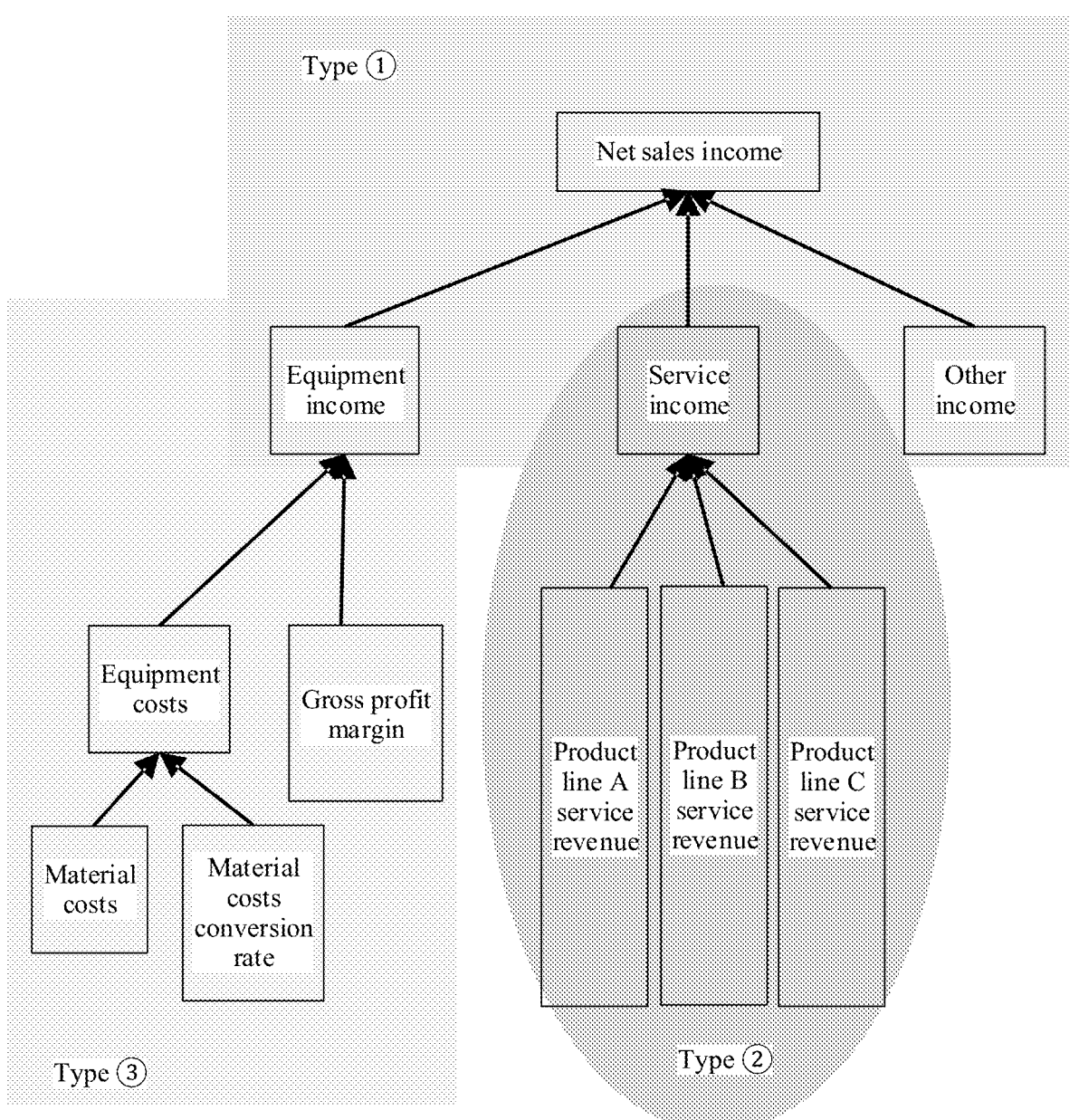
FIG. 4b is a combination diagram in which three types of models are included in a method of engineering forecast and analysis according to an embodiment of this application.

In a possible implementation, the forecasting model may be obtained through superposition of a plurality of types of forecasting path combinations. For example, generation of a forecasting model under a corporate-level financial management requirement is related to superposition and combination of a plurality of different types of forecasting paths. Further, as shown in FIG. 4b, a net sales income forecasting model integrates three different types of forecasting paths: a node relationship-type path, a dimension convergence-type path, and a baseline conversion-type path. A type ① block shows a forecasting path of an indicator relationship. In the figure, a net sales income indicator is directly associated with financial indicators such as an equipment income indicator, a service income indicator, and another income indicator, and indirectly associated with a lower-level business indicator. A type ② block shows a forecasting path in which bottom-up forecasting dimensions for the service income indicator converge from a low dimension to a high dimension. The forecasting path of the service income indicator converging from a fine dimension to a coarse dimension is reflected by convergence of service income forecasting of a plurality of product lines to corporate service income. A type ③ block shows combined use of multi-layer baseline conversion models. In the figure, equipment material cost is converted into equipment cost through a material cost conversion rate baseline, and equipment cost is converted into equipment income through a gross profit margin rate baseline.

Figure 4C:
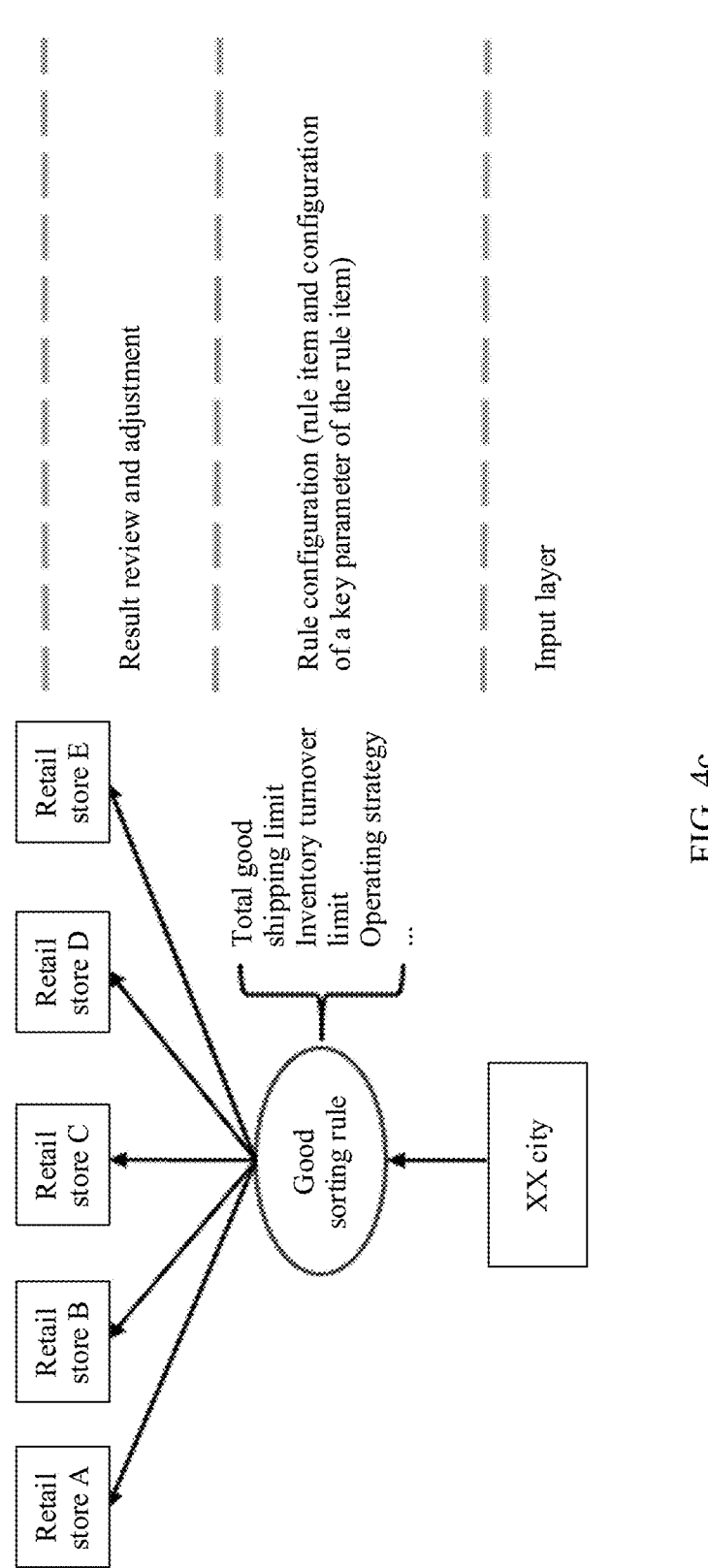

In a possible implementation, as shown in FIG. 4c, the forecasting model may be a reverse tree structure of multidimensional analysis. Corresponding adjustment and derivation are performed based on configuration in an existing forecasting path ②, to resolve a decision problem of reverse resource allocation of a same type ②. In addition, a deduction model oriented to such a decision problem can be effectively provided by adjusting configuration of an intermediate forecasting path and key information, to provide a quantitative basis for different decision solutions.

In a possible implementation, the foregoing different forecasting paths are correspondingly configured, related business and/or financial configuration information is matched based on the different forecasting paths, a forecasting model is constructed, and the forecasting path and the business configuration information is parsed into development code for operation.

In a possible implementation, for an abstracted forecasting path, a data configuration template and a rule configuration template are separately provided, and each type of forecasting path is translated into computer code that can be executed in a corresponding database.

One of common management decision-making problems in daily business activities of enterprises is resource allocation. This problem usually starts from a node with limited resources. Based on a business scenario of the resources at a specific operating management level, a related constraint and an allocation principle are defined to allocate the limited resources to a plurality of nodes at a next management level.

For example, based on definitions of three financial statements, a universal forecasting path is stored in the graph library 131 in this embodiment of this application in a form of a high-order directed graph as a basic template. A forecasting object expressed by an upper-layer node of the high-order directed graph may be set as an icon of a template in a type selection box of a forecasting node on the user interface. In different forecasting scenarios, the icon is moved by a user in a drag-and-drop manner to invoke the basic template.

Figure 5A:
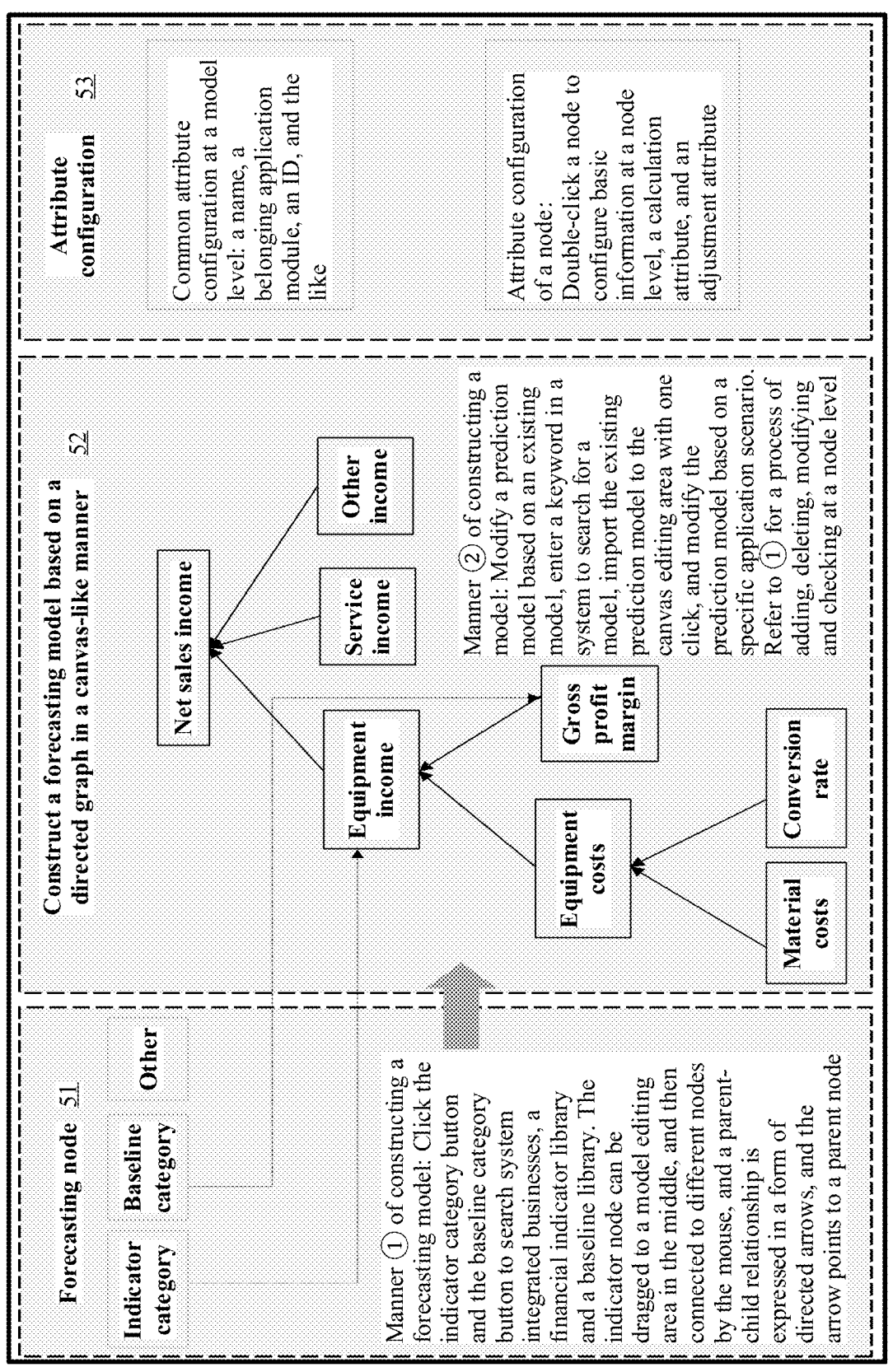
FIG. 5a is a schematic diagram of constructing a forecasting model through a user interface in a method of engineering forecast and analysis according to an embodiment of this application.
Figure 5B:
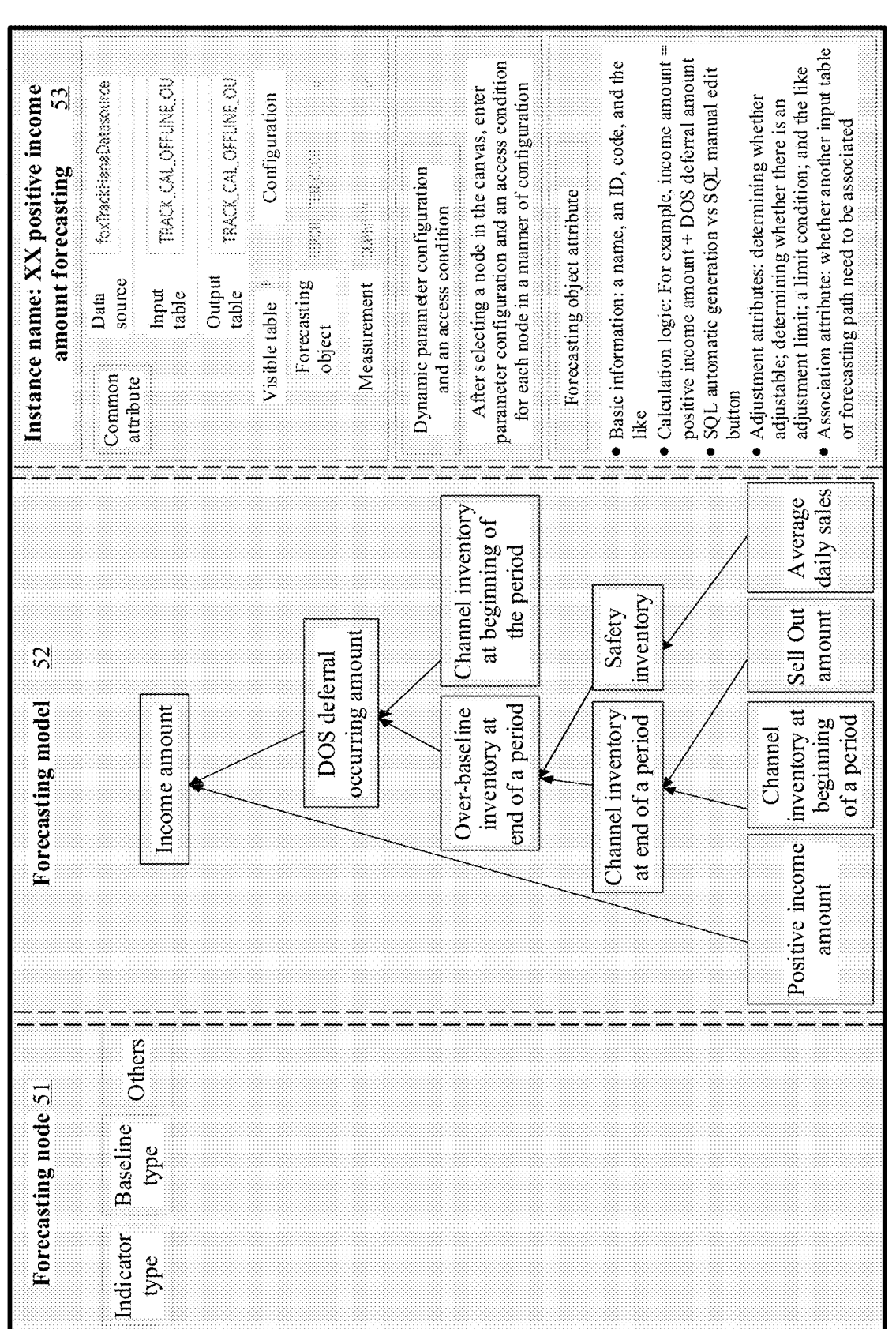
FIG. 5b is a schematic diagram of instantiation configuration of a forecasting model through a user interface in a method of engineering forecast and analysis according to an embodiment of this application.
Figure 5C:
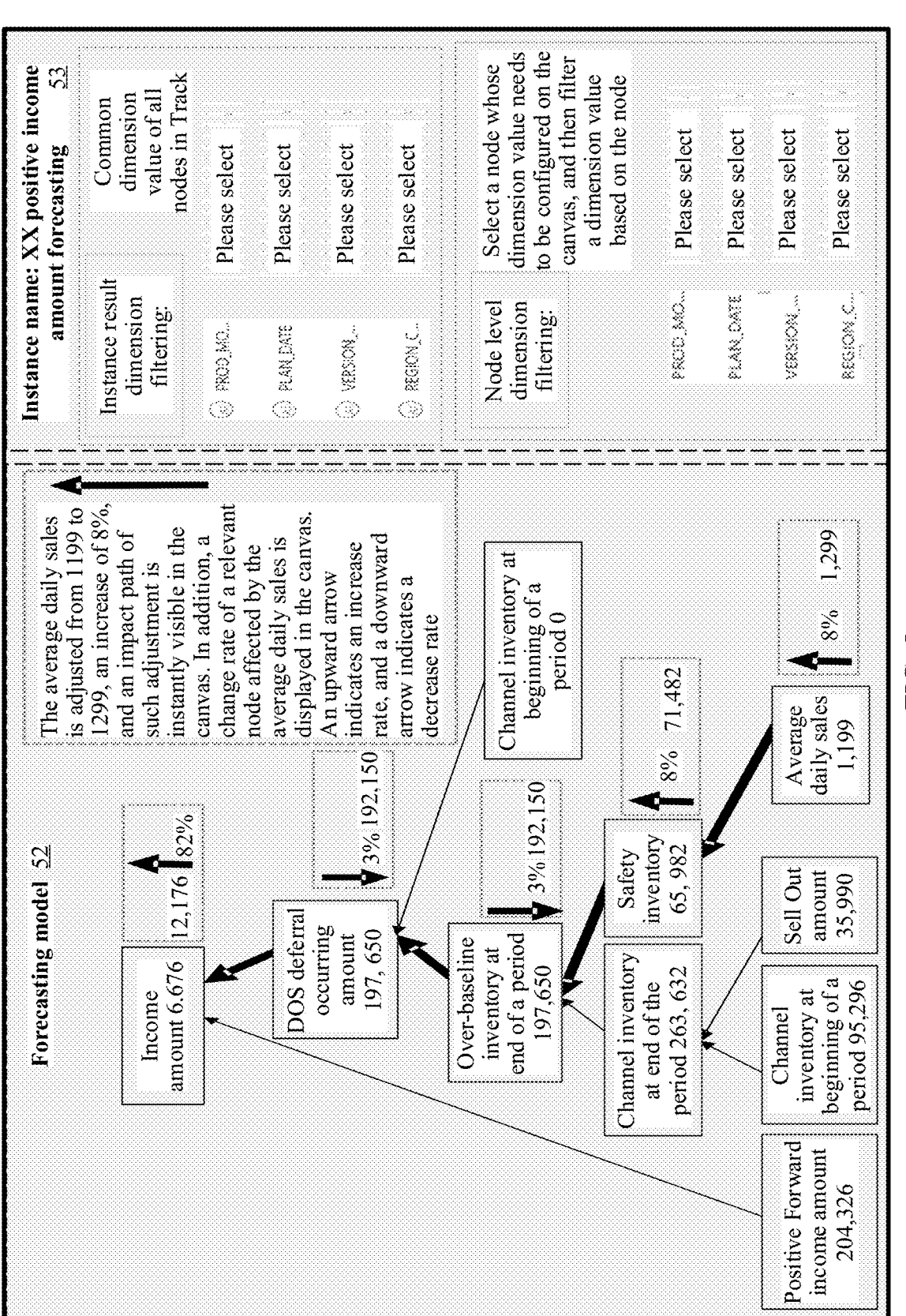
FIG. 5c is a schematic diagram in which parameter adjustment in a forecasting process and forecasting result association are explainable in a method of engineering forecast and analysis according to an embodiment of this application.

FIG. 5a to FIG. 5c are schematic diagrams of a user interface of an application layer of a method of engineering forecast and analysis.

FIG. 5a is a schematic diagram of a user interface for constructing a forecasting model. As shown in FIG. 5a, a user may configure and construct a template. In a possible implementation, a business personnel may click an indicator type or a baseline type button in a forecasting node area 51 to search for a business and financial indicator library and a baseline library that are integrated in the system, drag an indicator type node or a baseline type node to an intermediate model editing area 52, and then connect different nodes by using a mouse. A node relationship between a parent node and a child node is displayed by using a forecasting path expressed in a form of a directed arrow, and the arrow points to the parent node, to generate a template. Business personnel can perform configuration at a node level and configuration at a template level based on the created template.

A node relationship between every two of the plurality of nodes simultaneously expresses a logical determining and/or calculation rule. For example, in a forecasting path, if there is a calculation relationship between nodes, a start node of a directed edge is on the right side of an equation, and the start node is used as an input of calculation based on the calculation rule; and an end node pointed to by the directed edge is on the left side of an equation, and the end node is used as an output of the calculation rule.

For example, a node at a bottom end of a template expressed by a high-order directed graph is referred to as a leaf node, and the template further includes an intermediate node and a parent node (leading indicator).

For example, the user may configure a node attribute and a common attribute of the template in an attribute configuration area 53.

For example, in the forecasting model area 52, the user double-clicks a node to configure the node attribute, including defining the node, configuring an attribute of the node, and setting an algorithm between nodes, for example, an algorithm of logical determining and number calculation. Defining a node includes defining a forecasting object, a step size/frequency, a dimension, and an analysis granularity.

The attribute of the node is a forecasting object of the node. For example, configuring the attribute of the node includes configuring an adjustment attribute, a calculation sequence attribute, a node type, a forecasting limit, and the like.

For example, configuring the adjustment attribute includes setting a business scope, a forecasting object, a forecasting step size/frequency, and a forecasting dimension of the node; and setting the adjustment attribute to an adjustable or non-adjustable mode.

Configuring the calculation sequence attribute includes configuring a sequence for executing logic determining and a sequence for executing calculation.

Configuring a type of a node includes configuring a node as a computing-type node, a conditional determining-type node, an information-type node, or an algorithm-type node.

For example, there may be a many-to-many relationship between nodes, that is, one node may be used as input of a plurality of upper-layer nodes at the same time.

For example, a template may be a high-order directed graph formed by two or three layers of nodes and directed edges between the nodes, or may be a mesh structure that is connected by using nodes in a directed manner, and a multi-way tree structure is a simple template.

For example, configuration of the common attribute includes an application attribute of the template, an identity (ID) of the template, and the like. The application attribute is, for example, an attribute of three financial tables, a business scope, and the like. The ID is a code indicating a location in a computer and an identity that are of a target. The three financial statements include the balance sheet, a profit account, or a cash flow statement.

A user can store a high-order directed graph as a template for generalized use for future forecasting scenarios. An existing template can also be applied to new generated business data to form a healthy iterative cycle of enterprise financial forecasting knowledge.

In a possible implementation, a template may be a template included in a system. The business personnel may enter a keyword in a dialog box in the forecasting node area 51 to search for a template included in the system, import an existing template to the forecasting model area 52 by one click, and then modify the template based on an application scenario of a business or financial operation, to add, delete, modify, and query at the node level.

The user can also edit the template, and configure the node attribute and the common attribute of the template in the attribute configuration area 53.

A button is set on the user interface in FIG. 5a to enter an interface shown in FIG. 5b and an interface shown in FIG. 5c. Clicking an instantiation button set on the user interface to enter the user interface shown in FIG. 5b to instantiate the forecasting model.

FIG. 5b is a schematic diagram of a user interface of a forecasting model instantiation configuration. As shown in FIG. 5b, a user performs instantiation configuration on a template to implement a connection between the template and instance data. An IT engineer may input, by using a configuration box in the attribute configuration area 53, related information required for instantiation, to perform instance configuration at a model level and instance configuration at a node level, and computer-executable parsing code, for example, a structured query language (SQL) statement, is obtained through conversion of a background semantic parsing engine.

For example, instance configuration information that is at a model level and that is of the template and configuration information of a node instance are displayed in the attribute configuration area 53.

For example, the user can perform model-level instance configuration in the attribute configuration area 53, including configuration of common attribute instantiation, for example, an ID of a data source, an ID of an input table, an ID of an output table, visualization configuration, an ID of a forecasting object, and a dimension measure.

For example, the user may double-click a node in the forecasting model area 52, and input information configuration and a data obtaining condition of each node in the attribute configuration area 53.

For example, the user double-clicks a node in the forecasting model area 52, and enters an attribute of a node instance in the attribute configuration area 53, including basic configuration information, calculation logic, an SQL automatic generation vs SQL manual editing button, an adjustment attribute, and an association attribute.

For example, basic information of the node instance is configured, for example, a node instance name, an ID, a code, and the like.

For example, the calculation logic is configured, for example, income amount=positive income amount+days of supply (DOS) deferral amount.

For example, a button is set, and the button is used to select SQL automatic generation or SQL manual generation, or the like.

For example, a node adjustment attribute is configured, for example, whether the node is adjustable, whether there is an adjustment limit, a limit condition, and the like.

For example, a node association attribute is configured, for example, whether another input table or forecasting model needs to be associated.

During the instantiation configuration of a forecasting model, a same template can be reused in different databases and converged in different forecasting dimensions for different forecasting targets. In addition, the forecasting model can be edited to support quick generalization of the forecasting model in a similar forecasting scenario, avoiding repeated development of reusable forecasting models.

For example, an IT engineer can enter a common attribute and a node-level personalized attribute related to instantiation in a configuration box in the attribute configuration area 53. When a node is double-clicked in the forecasting model area 52, a configuration box popping up in the forecasting object attribute area 53 may be used to perform node instantiation configuration based on data input in the configuration box, while a template defined in FIG. 5a is combined in the background, and the parsing engine converts the node instantiation configuration into computer-executable parsing code. For a node that needs to be reviewed or adjusted by IT personnel, the button is double-clicked to verify a forecasting path and forecasting dimension information on the node and output a forecasting result to the output table.

In a possible implementation, the user performs the instantiation configuration of the forecasting model based on the following steps S601 to S603:

S601: Select a leaf node in the forecasting model area 52, and configure link information of a data source corresponding to the leaf node in a configuration box of the forecasting object attribute area 53.

S602: Select an intermediate child node in the forecasting model area 52, configure a related attribute at the level in a configuration box of the forecasting object attribute area 53, including a common attribute and a personalized attribute of the node level, and configure a forecasting dimension of the node; and generate a forecasting model.

S603: Review the forecasting model, and verify a forecasting result and the forecasting dimension on the node.

In a possible implementation, a user may configure a multi-dimensional data source in a forecasting model instantiation process, to connect databases of different enterprises.

After the database connection and the forecasting dimension are configured, the forecasting model and instantiation-related configuration information are parsed into computer-executable parsing code through the background parsing engine.

In this embodiment of this application, a process of constructing a forecasting model and an instantiation configuration process of the forecasting model are designed in a decoupling manner. Different persons separately construct a forecasting model and perform instantiation configuration of the forecasting model on interfaces in FIG. 5a and FIG. 5b, and then a semantic parsing engine implements an engineering connection between the forecasting model and a data source.

According to the method provided in this embodiment of this application, matched configuration information is provided based on a deployment environment of enterprise data, to implement data source connection of different nodes.

The user may review the forecasting model in the forecasting model area 52 of FIG. 5b to ensure that a logical determining and calculation rule expressed by the forecasting model is consistent with the computer-executable parsing code. In addition, the IT engineer can double-click a node that requires special processing in the forecasting model and adjust the node in an editing box. The adjustment operations include adding a node, deleting a node, modifying a parameter, and checking configuration. A button is set on the user interface in FIG. 5b to enter the interfaces shown in FIG. 5c and FIG. 5a. The user may enter FIG. 5c by clicking a "Visualization" button set on the user interface, and perform review and adjustment based on the forecasting model in the user interface.

FIG. 5c is a schematic diagram of a user interface for reviewing and adjusting a forecasting result. A "Submit" button is set on the user interface in FIG. 5c. A forecast and analysis result may be displayed by clicking the button. For example, after the "Submit" button set on the user interface in FIG. 5c is clicked, a related data source is connected based on the forecasting model, and data forecast and analysis is performed at a configured forecasting dimension level.

As shown in FIG. 5c, in the forecasting model area 52, input data table information of the leaf node, calculation process information of the intermediate node, and forecasting result information of the parent node are displayed, and influence information of node adjustment is further displayed. A forecasting model of a positive income amount in the figure as an example. A daily average sales amount is adjusted from 1199 to 1299, increasing by 8%. An influence path of the adjustment is visible in the forecasting model area 52. In addition, a change rate of a related node affected by the daily average sales amount is displayed in the forecasting model area 52. An upward arrow indicates an increase rate, and a downward arrow indicates a decrease rate.

For example, in the attribute configuration area 53, an instance name may be displayed, for example, XX positive income; instance result dimension filtering information may be displayed, for example, a dimension value shared by all nodes in the model, including a product, a date, a version, and a region; and node-level dimension filtering information may be further displayed, for example, a product, a date, a version, and a region of a node whose dimension value needs to be configured in a personalized manner.

For example, in the attribute configuration area 53, the user may adjust a logical determining and calculation rule, and connect data calculation in real time, to display a model affected by rule adjustment and a change rate of an affected node.

For example, the user adjusts dimension values of all nodes in the attribute configuration area 53, and performs real-time connected data calculation. A model affected by adjustment of the dimension value shared by all nodes and a change rate of the affected node are displayed in the forecasting model area 52.

For another example, after a node for which a dimension value needs to be configured is selected in a personalized manner, dimension values are filtered based on a situation of the node, and connected data calculation in real time is performed. In the forecasting model area 52, a model affected by adjustment of a dimension value of the personalized configuration and a change rate of the affected node are displayed.

According to the method of engineering forecast and analysis provided in this embodiment of this application, a forecasting model is constructed by type, adapting to an interactive configuration design and a semantic parsing engine, to support cross-type construction of a complex forecasting model and support multi-instance forecasting verification.

In a possible implementation, linkage visualization between a forecasting path and data is implemented by performing S701 to S703. An exemplary procedure is as follows:

S701: Adjust an analysis granularity of a node based on a forecasting result. For example, the analysis granularity may be an attribute shared by all nodes in the model, or may be a node that requires personalized configuration.

S702: Select a node with an adjustment attribute to adjust a dimension value, and perform hypothetical trial calculation based on a link between a forecasting model and a data source.

S703: Set an identifier indicating influence of node adjustment, and obtain a forecasting data change rate obtained after each node in the model is adjusted.

S704: Adjust the forecasting model based on the change rate of the forecasting data, and perform deduction verification on an uncertain forecasting model, to obtain an ideal forecasting model.

For example, if a forecasting result increases in a positive direction after node adjustment, the influence identifier may be set to be displayed as an up arrow; or if a forecasting result decreases in a negative direction after node adjustment, the influence identifier may be set to be displayed as a down arrow.

This solution enables forecasting operators to adjust a forecasting path in real time based on a forecasting result and connect to a data source for trial calculation, to obtain an influence process of forecasting path adjustment and an information change rate of an affected node.

In a possible implementation, a forecasting operator constructs a forecasting model for an uncertain forecasting scenario, performs hypothetical trial calculation based on a link between the forecasting model and a data source, adjusts the forecasting model based on a forecasting result of the trial calculation, and performs derivation verification on an uncertain forecasting path, to obtain an ideal forecasting model.

In this solution, related data sources are linked based on instance configuration information. A graph query technology is used, all sub-graphs affected by the forecasting model adjustment are fed back in real time, and an information change rate of each affected node is quantified to analyze influence of forecasting model adjustment in a quantitative manner. Influence of a forecasting model is obtained by quantifying a change of a local forecasting path. Decoupling of a forecasting rule and data enables division of work between different professions. In addition, a process-based forecasting path and data linkage enable efficient collaboration between different professionals.

In this embodiment of this application, based on a configuration user interface of a high-order directed graph and an application exploratory analysis in which a process of forecasting a path is visualized, after initial configuration of a forecasting model is completed, a business personnel can independently complete an entire process of discovery, exploration, and inference without assistance of an IT professional. Graph data can be quickly invoked. Attribute distribution of massive forecasting objects can be calculated, and results can be returned in seconds. Forecasting business personnel can make decisions in real time and quickly respond to business changes or market emergencies. Financial forecasting knowledge extracted from massive data and experience accumulated by business experts are verified for use, and are consolidated into new knowledge and stored in a graph library.

According to the method of engineering forecast and analysis provided in this embodiment of this application, a collaborative operation between a plurality of nodes in a complex forecasting operation flow can be implemented through ordered connection and related attribute configuration of a plurality of forecasting paths on a forecasting model.

In a possible implementation, the constructing a forecasting operation flow based on a forecasting model includes: A forecasting model A and at least one forecasting model B are obtained, and a first forecasting rule and first configuration information for starting and generating a first forecasting rule are configured on the forecasting model A. The first configuration information includes a first start condition, a first database, and a linkage relationship between the first forecasting rule and a second forecasting rule. A second forecasting rule and second configuration information for starting and generating the second forecasting rule are configured on the forecasting model B. The second configuration information includes a second start condition, a second database, and a linkage relationship between the first forecasting rule and the second forecasting rule. The first forecasting model and the second forecasting model are sequentially connected based on the linkage relationship between the first forecasting rule and the second forecasting rule, to form a forecasting operation flow.

Figure 6A:
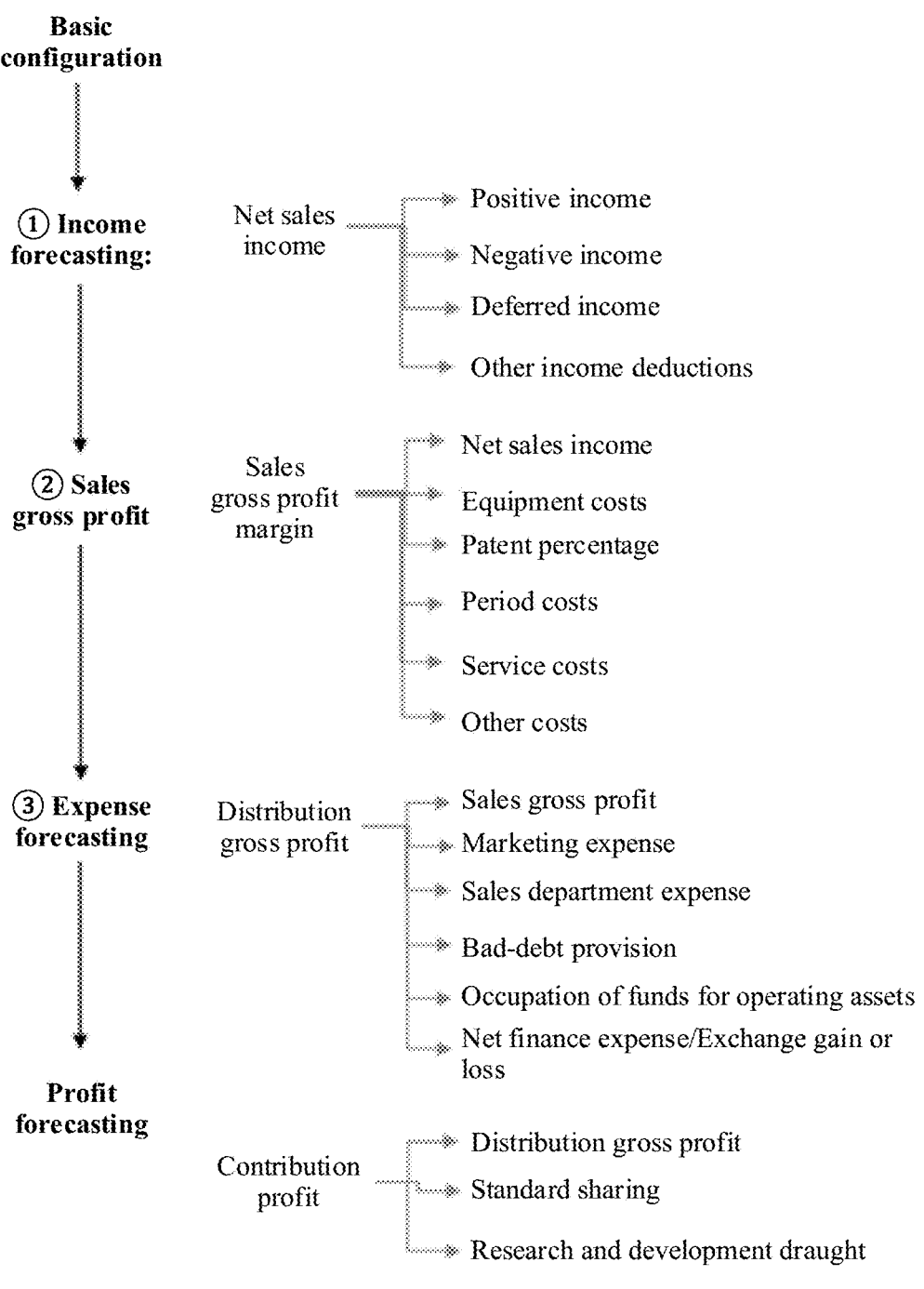
FIG. 6a is a schematic diagram of a profit forecasting operation flow performed at a fixed time point in a method of engineering forecast and analysis according to an embodiment of this application.
Figure 6B:
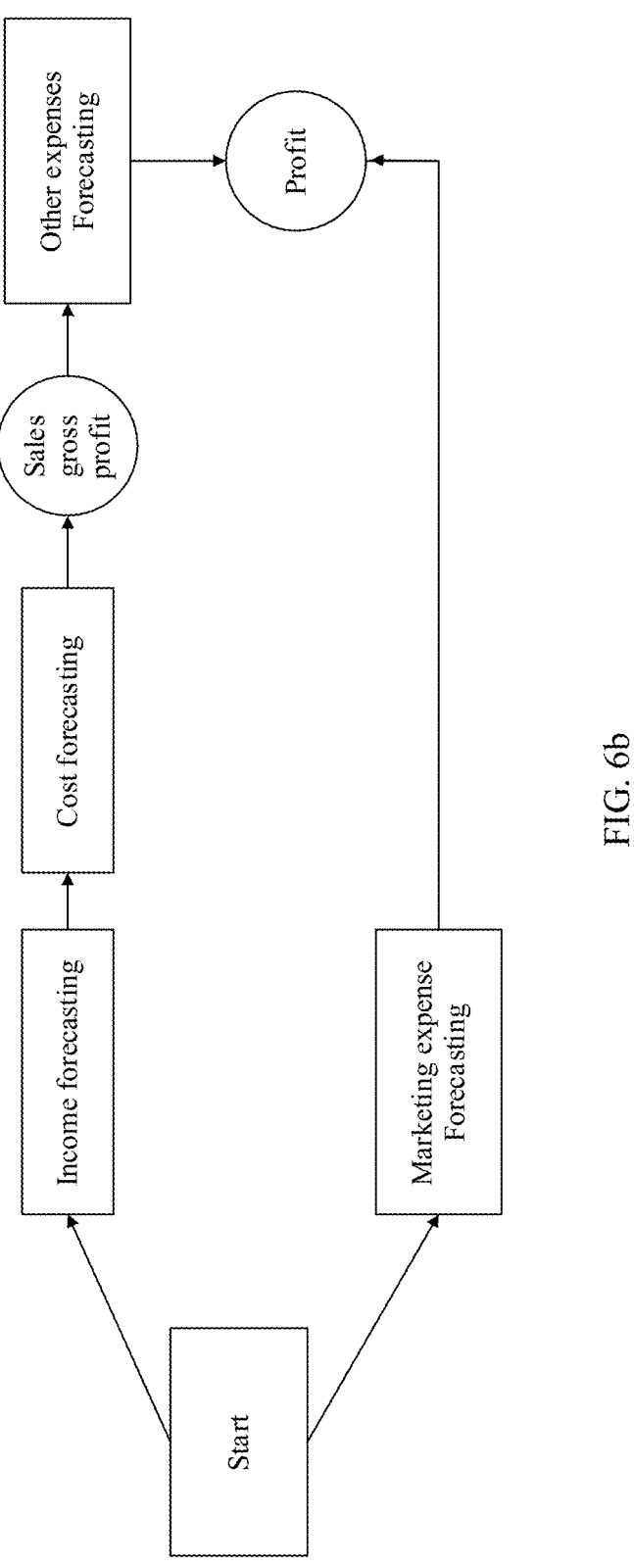
FIG. 6b is a schematic diagram of scheduling a related forecasting instance in a profit forecasting operation flow in a method of engineering forecast and analysis according to an embodiment of this application.

A most common profit forecast in enterprise operation management is used as an example. A routine profit forecasting operation flow at a fixed time point is shown in FIG. 6*a*. A first forecasting operation line in which an income forecasting node, a cost forecasting node, a sales gross profit forecasting node, and another expense forecasting node are serial is parallel to a marketing expense forecasting operation line in FIG. 6*b*, and the two are finally aggregated to form a profit forecast. The forecasting operation flow can use an income forecasting model to express an income forecasting node, use a cost forecasting model to express a cost forecasting node, use a sales gross profit forecasting model to express a sales gross profit forecasting node, and use another expense forecasting model to express another expense forecasting node. In addition, a forecasting rule and related configuration information (such as a start condition, a related database, and linkage between forecasting rules) are configured on each forecasting node/forecasting model.

Based on complexity of the forecasting model expressed by each node, one or more forecasting rules can be configured. For example, an "income forecasting" node is usually configured with two forecasting rules: positive income forecast and negative income forecasting. Based on the complexity of the forecasting model expressed by each node, one or more forecasting instances can be configured. For example, the "income forecasting" node is usually configured with two forecasting instances: positive income forecast and negative income forecasting. The negative income forecasting can be split into a plurality of sub-instances based on complexity of enterprise negative income forecasting. In addition to mutual invocation of forecasting rules between nodes, a plurality of forecasting rules on a same node can also be configured for collaboration. For example, a positive income amount in the positive income forecasting will be used as input information of the negative income forecasting. Dependency between the two forecasting rules can be implemented through configuration of forecasting rules.

The decoupling design effectively avoids articulation between a plurality of versions of forecasting operation. As an automatically generated version is initialized, the version is independent of subsequent operation adjustment. A related node on a forecasting path is identified for incremental scheduling, and a forecasting result is quickly generated based on adjustment operation.

Financial forecasting often uses algorithms such as statistical learning or machine learning to capture rules from historical data and forecast future changes based on the rules.

In the method of engineering forecast and analysis provided in this embodiment of this application, the forecasting model may be connected to an algorithm-based forecasting result, that is, the algorithm-based forecasting result is used as data of the leaf node and input into the forecasting model; or the forecasting model is directly connected to a trained algorithm model output interface, and the algorithm is invoked in real time to perform forecasting, and is combined with latest business or financial data inputting integrated by the system, to finally perform data forecast and analysis. When an algorithm is used to forecast a forecasting object, the forecasting model formed based on the forecasting rule provides effective assistance for the algorithm and can learn knowledge from forecasting data more efficiently. The forecasting model stored in the form of graph data can integrate business logic, a financial rule, and expert experience into algorithm construction steps such as abnormal data identification, feature engineering, information adjustment, and forecasting scenario segmentation, to improve algorithm learning efficiency and using well-founded knowledge to improve algorithm forecasting quality.

For example, sales amount forecasting of a product is used as a bottom-layer input node of product income forecasting. A sales amount forecasting result is used as an input node of income forecasting based on historical data. Relationship and instance query is performed based on a total profit and loss calculation rule graph to identify a calculation rule related to the sales amount forecast and an important business rule included in an instance in enterprise profit forecasting background. The calculation rule and the important business rule are reversely transferred to an algorithm modeling process as background knowledge, to significantly improve sales amount forecasting quality.

After the forecasting model automatically generates a version of a forecasting result based on an instance, a business expert reviews the forecasting result generated by the model, makes estimation based on professional knowledge and experience of the expert, and adjusts the forecasting result. A completed process of a forecast task needs experts in different domains to review and adjust forecast in a forecast time window until a final version of the forecast is submitted.

According to the method of engineering forecast and analysis provided in this embodiment of this application, forecasting review and adjustment functions can be implemented, to systematically store adjustment information made by a business expert based on a forecasting object and a forecasting operation process. Adjustment information may further include adjustment information of a forecasting rule and a time for adjusting the forecasting rule.

In a possible implementation, the adjustment information may be used as behavior data of the business expert, to obtain a digital forecasting behavior profile of the business expert. The forecasting behavior profile can be fed back to the business expert to support review and backtracking. Moreover, the forecasting behavior profile can provide a prior model for input when the business expert needs to make an estimation on an emergency or enterprise policy adjustment. The digital forecasting behavior profile can be integrated into a constructing process of a forecasting model in a form of probability distribution or automatically integrated into a forecasting path in a forecasting model for a similar event.

In addition, an enterprise has permission to split forecast among financial management modules of the enterprise.

According to the method of engineering forecast and analysis provided in this embodiment of this application, based on a requirement of financial forecasting timeliness, a forecasting operation flow may be flexibly configured to implement time-based operation permission control, and a permission configuration unit that can be defined as required is provided for complex permission configuration. The permission configuration unit can be a baseline node in a forecasting model, a branch in a forecasting model, one or more forecasting rules, or an entire forecasting operation flow.

In this embodiment of this application, physical connections between data, knowledge, data and knowledge, knowledge and operators are established by interaction design for connection and configuration, conversion and analysis, adjustment and feedback, and material execution among different knowledge forms. In addition, systematic feedback is provided during systematically-carried knowledge fusion and systematic backtracking management is provided. Based on this, knowledge accumulation, review, reasoning, and verification can be efficiently implemented.

An embodiment of this application provides a method of engineering forecast and analysis. A forecasting knowledge network is formed based on unified knowledge to represent a plurality of types of forecasting knowledge bases for knowledge consumption, integration, and accumulation. According to the system architecture of the method of engineering forecast and analysis provided in this embodiment of this application, a forecasting model management platform for enterprise financial forecasting is established, so that business and financial knowledge related to forecasting can be accumulated, dependency on human experience inheritance of enterprise financial forecasting is reduced, and a forecast and analysis operation that integrates multiple data, multiple knowledge, and multiple roles is supported.

An embodiment of this application provides a method of engineering forecast and analysis system. The system provides a forecasting model management platform based on a multi-knowledge representation fusion technology, and provides a forecasting model that can connect enterprise data, business logic, financial rules, algorithms, and expert estimation. Financial or business data forecasting of an enterprise can be implemented in an engineering manner. Moreover, flexible business and/or financial rule adaptation is performed by using a human-machine interaction user interface provided by the forecasting model management platform, to help an expert to appropriately intervene and adjust a forecasting result.

Figure 7:
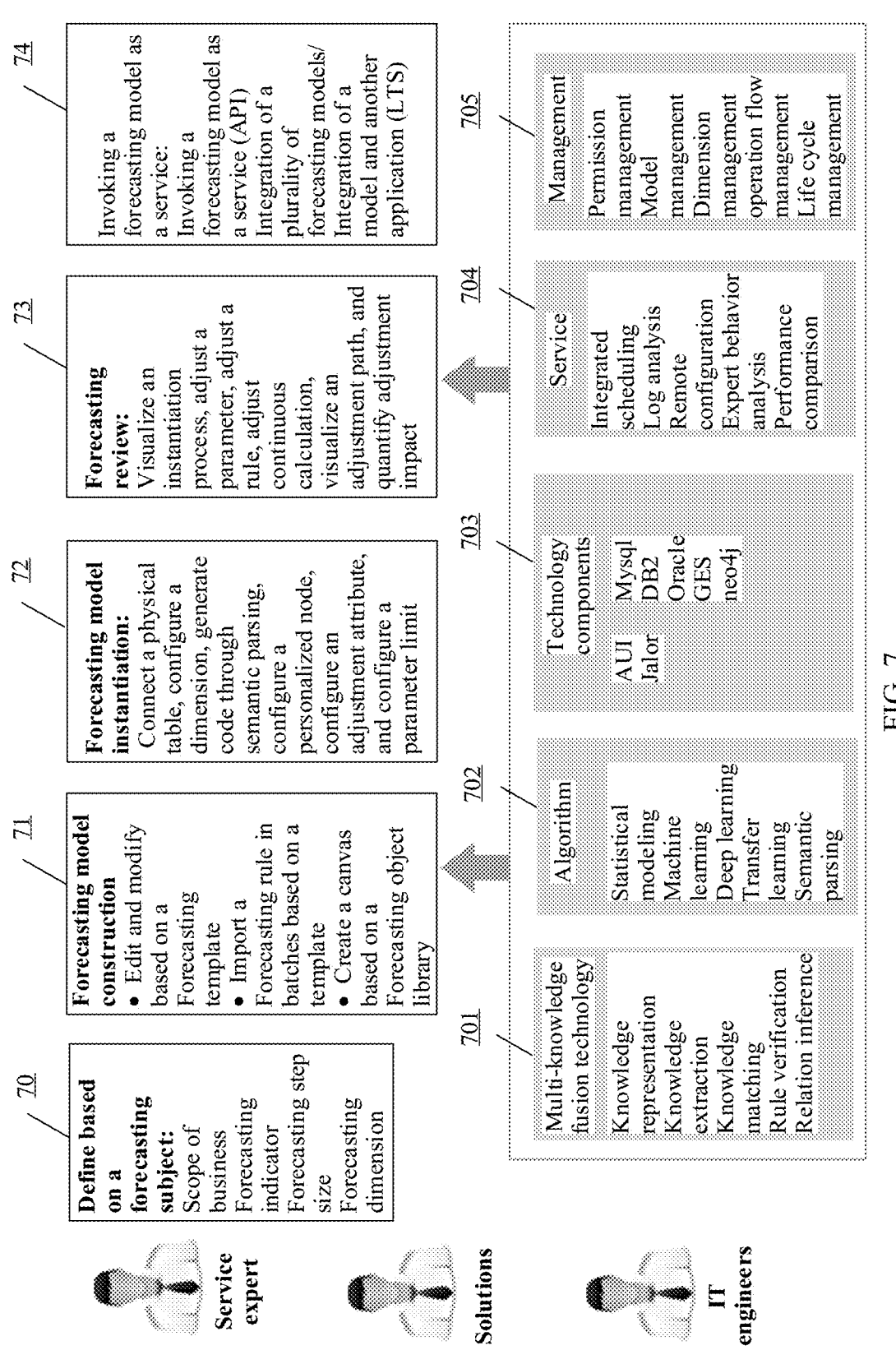
FIG. 7 is a block diagram of functional modules of a method of engineering forecast and analysis according to an embodiment of this application.

FIG. 7 is a block diagram of functional modules of a method of engineering forecast and analysis system according to an embodiment of this application. As shown in FIG. 7, a data forecasting engineering analysis apparatus in this embodiment of this application includes a definition module 70, a construction module 71, an instantiation module 72, a review and adjustment module 73, and a service-oriented invoking module 74. Specifically, the definition module 70 obtains a business scope, a forecasting object, a forecasting step size/frequency, and a forecasting dimension defined by a business expert and a solution analyst based on a node through an application interface.

The construction module 71 is configured to import a forecasting rule in batches based on a template, or construct a template in a form of a high-order directed graph based on a forecasting object, and edit and modify the template.

The instantiation module 72 is configured to link to a data source related to a forecasting object of a forecasting model, configure a forecasting dimension of the forecasting model based on an input parameter of a user, configure a personalized node, configure an adjustment attribute of the node, and configure a parameter information limit threshold, parse the forecasting model into computer-executable parsing code by using JSON and XML parsing engines, and input the parsing code into the linked data source by using an API interface; and execute the parsing code on the data source to perform data financial and analysis for data forecasting objects of different forecasting dimensions.

The review and adjustment module 73 is configured to review configuration information and a forecasting result of a node of the forecasting model, adjust the node, a node dimension, adjust node configuration information, adjust a version of the forecasting model, and adjust forecasting path configuration and rule integration relationship configuration.

The service-oriented invoking module 74 is configured to store the forecasting model, invoke the forecasting model as a service, and integrate a plurality of forecasting models or integrate the model with another application.

In a business scenario, a business expert and a solution analyst define a node by using the definition module 70, including defining a business scope, an indicator, a step size, a frequency, and a dimension for forecasting. First, a forecasting model is defined in the construction module 71. Then, an IT engineer configures a connection between a data source and the forecasting model in the instantiation module 72, and parses the forecasting model into computer-executable parsing code by using a parsing engine, to obtain a forecasting result. Then the forecasting result is reviewed and adjusted by the business expert and the solution analyst in the review and adjustment module 73. Finally, in the service-oriented invoking module 74, the forecasting model is saved and invoked as a service, and the plurality of forecasting models are integrated or the forecasting model is integrated with the another application.

The foregoing operable functional modules implemented based on application engineering are supported by five components related to the IT technology of the forecasting model management platform: a multi-knowledge fusion component 701, an algorithm component 702, a technical component 703, a service component 704, and a management component 705.

The knowledge fusion component 701 is configured to perform knowledge representation, knowledge extraction, knowledge matching, rule verification, knowledge reasoning, and knowledge storage based on a multi-knowledge representation technology. The definition module 70 supported by the knowledge fusion component 701 can obtain the business scope, the forecasting object, the forecasting step size/frequency, and the forecasting dimension defined based on the node, and implement knowledge representation. The construction module 71 supported by the knowledge fusion component 701 can edit and modify the template based on the node, import forecasting paths in batches, and construct a forecasting model based on the high-order directed graph, to implement knowledge extraction.

The algorithm component 702 is configured to perform statistical modeling, machine learning, deep learning, transfer learning, and semantic parsing to practice learning from data. With the support of the algorithm component 702, the review and adjustment module 73 can review configuration information and a forecasting result of a node of the forecasting model, adjust a node, a node dimension, adjust node configuration information, adjust a version of the forecasting model, adjust forecasting path configuration, and configure a rule integration relationship, to implement rule check and relational inference.

The technical component 703 is configured to link database interfaces. With support of the technical component 703, the instantiation module 72 can implement functions such as connecting to a data source, configuring a forecasting dimension, configuring a personalized node, configuring an adjustment attribute of the node, and configuring an information limit threshold, parsing the forecasting model into computer-executable parsing code by using the parsing engine, and obtaining a forecasting result through calculation. The instantiation module 72 can be configured and connected to the knowledge management layer 13 to implement knowledge matching.

The service component 704 is configured to perform integrated scheduling, log analysis, remote configuration, expert behavior analysis, and performance comparison. With support of the service component 704, the service-oriented invoking module 74 can implement service-oriented invoking such as integrated scheduling, log analysis, remote configuration, expert behavior analysis, and performance comparison on the forecasting model.

The management component 705 is configured to perform management such as permission management, operation flow management, model management, and dimension and life cycle management on service-oriented invoking of the forecasting model.

With support of the management component 705, the service-oriented invoking module 74 can implement service-oriented invoking on the forecasting model, and combine a plurality of forecasting models or combine the forecasting model and another application.

Embodiments of this application provide a flexible and simple human-computer interaction manner for constructing a forecasting model, to process complex and diversified association relationships between forecasting objects, construct an interactive engineering system, and meet requirements of different phases of analysis and exploration, generalization implementation, and knowledge management in forecasting.

Embodiments of this application provide a method of engineering forecast and analysis system. The system provides a forecasting model management platform based on a multi-knowledge representation fusion technology, and expresses a multi-type forecasting knowledge library based on a unified knowledge representation method. A high-order directed graph forecasting knowledge network is used for knowledge consumption, integration, and accumulation, so that business and financial knowledge related to nodes can be systematically accumulated, dependency on human experience of enterprise financial forecasting is reduced, and a forecast and analysis operation that integrates multiple data, multiple knowledge, and multiple roles is supported.

Embodiments of this application provide a method of engineering forecast and analysis system, and a structured forecasting model is established for complex knowledge in the financial field by using a multi-knowledge representation fusion technology. Forecasting objects, forecasting paths, business logic, and financial rules are stored as forecasting models at different management and analysis levels through unified knowledge. The forecasting models are associated and integrated. An advantage of constructing the forecasting model in this way is that descriptive expert knowledge in a business language, rule information existing in expert experience estimation, and knowledge learned from data by using various algorithms can be expressed in a manner that is easy to store by a machine. In addition, a user interface of the engineering forecast and analysis system provided in this embodiment of this application interacts with a forecasting user, to efficiently integrate new knowledge and feedback influence of the knowledge on an existing forecasting system in a timely manner, to effectively implement generation and iteration of the forecasting model.

A person of ordinary skill in the art may be aware that, in combination with the examples described in embodiments disclosed in this disclosure, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of embodiments of this application.

In addition, aspects or features in embodiments of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage device (for example, a hard disk, a floppy disk, or a magnetic tape), an optical disc (for example, a compact disc (CD), a digital versatile disc (DVD)), a smart card, and a flash memory device (for example, an erasable programmable read-only memory (EPROM), a card, a stick, or a key drive). In addition, various storage media described in this disclosure may indicate one or more devices and/or other machine-readable media that are configured to store information. The term "machine-readable medium" may include but is not limited to a radio channel, and various other media that can store, include and/or carry instructions and/or data.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

When the functions are implemented in the form of a software functional unit and sold or used as an independent product, the functions may be stored in a computer-readable storage medium. Based on such an understanding, the technical solutions of embodiments of this application essentially, or the part contributing to the prior art, or some of the technical solutions may be implemented in a form of a software product. The software product is stored in a storage medium, and includes several instructions for instructing a computer device (which may be a personal computer, a server, or an access network device) to perform all or some of the steps of the methods described in embodiments of this application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely exemplary implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method of engineering forecast and analysis, applied to an apparatus that comprises at least one processor and a semantic parsing engine, wherein forecasting is performed based on multi-knowledge fusion of financial data or business data, and the method comprises:

generating, by the at least one processor, a first forecasting model based on financial or business information obtained through a user interface, wherein the first forecasting model expresses at least one of a logical determining and a calculation rule based on a structure of a high-order directed graph and by using a plurality of nodes, attributes of the plurality of nodes and a relationship between every two of the plurality of nodes, and the first forecasting model expresses a first forecasting path through a directed edge between the nodes;

configuring, by the at least one processor, a common attribute of the first forecasting model, an attribute of the first forecasting path, and a personalized attribute of the node based on instantiation configuration information, wherein the common attribute of the first forecasting model is used to set a connection relationship between the first forecasting model and a data source, an input table, and an output table, the attribute of the first forecasting path is used to set a correspondence between the logical determining and/or calculation rule and data, and the personalized attribute of the node is used to set a forecasting object and a forecasting dimension that are expressed by each node;

converting, by the semantic parsing engine, the first forecasting model and the instantiation configuration information into a first computer-executable parsing code, wherein the first parsing code is used to: connect the first forecasting model to the data source, the input table, and the output table in an engineering manner based on the common attribute of the first forecasting model; execute, on the input table of the data source based on the first forecasting path, the logical determining and calculation rule that is expressed by the first forecasting model; and determine forecasting data that is of the forecasting object and that is expressed by each node in the forecasting dimension, and output the forecasting data to the output table or display the forecasting data on the user interface;

generating, by the at least one processor, a second forecasting model based on the financial or business information obtained through the user interface;

configuring, by the at least one processor, a common attribute of the second forecasting model, an attribute of a second forecasting path, and a personalized attribute of a first node based on obtained first instantiation configuration information, and determining, by the at least one processor, a first calculation rule and a second calculation rule;

configuring, by the at least one processor, a linkage relationship between the first calculation rule and the second calculation rule; and converting, by the semantic parsing engine, the first forecasting model and the second forecasting model, the first instantiation configuration information and the second instantiation configuration information, and the linkage relationship between the first calculation rule and the second calculation rule into a second computer-executable parsing code, wherein sequentially connecting, by the second parsing code, the first forecasting model and the second forecasting model based on the linkage relationship between the first calculation rule and the second calculation rule, to generate a forecasting operation flow, and storing the forecasting operation flow in a graph database as a high-order directed graph structure.

2. The method according to claim 1, wherein the forecasting path of the first forecasting model comprises a node relationship path, the node relationship path is a high-order directed graph in which the plurality of nodes are in a directed connection in a progressive manner layer by layer from bottom to top, and a same node is associated with a plurality of nodes at different levels.

3. The method according to claim 1, wherein the first forecasting path of the first forecasting model comprises a dimension convergence path, and the dimension convergence path is a multi-way tree structure in which the plurality of nodes are connected according to a forecasting dimension convergence principle.

4. The method according to claim 1, wherein the first forecasting path of the first forecasting model comprises a baseline conversion path, the baseline conversion path comprises a plurality of layers of baselines, and each layer of baseline in the plurality of layers of baselines is a multi-way tree structure formed by the plurality of nodes.

5. The method according to claim 1, wherein the generating, by the at least one processor, the first forecasting model based on the financial or business information obtained through the user interface comprises:

invoking, by the at least one processor, one or more forecasting models based on information input through the user interface.

6. The method according to claim 1, wherein the generating, by the at least one processor, the first forecasting model based on the financial or business information obtained through the user interface comprises:

invoking, by the at least one processor, a template from a financial or business template library based on information in the user interface, wherein a structure of the template is the high-order directed graph; and determining, by the at least one processor, based on the template, the logical determining and calculation rule by defining the plurality of nodes, configuring, by the at least one processor, the attributes of the plurality of nodes and the relationship between every two of the plurality of nodes, and determining, by the at least one processor, the first forecasting path based on a connection relationship between directed edges of the nodes, to generate the first forecasting model.

7. The method according to claim 1, wherein the generating, by the at least one processor, the first forecasting model based on the financial or business information obtained through the user interface comprises:

selecting, by the at least one processor, a plurality of nodes from an indicator library and/or baseline library based on the information obtained through the user interface; and determining, by the at least one processor based on the financial or business information obtained through the user interface, the logical determining and calculation rule by defining the plurality of nodes, configuring, by the at least one processor, the attributes of the plurality of nodes and the relationship between every two of the plurality of nodes, and determining, by the at least one processor, the first forecasting path by connecting the directed edges of the plurality of nodes, to generate the first forecasting model.

8. The method according to claim 6, wherein the determining, by the at least one processor, the logical determining and calculation rule by defining the plurality of nodes, configuring, by the at least one processor, the attributes of the plurality of nodes and the relationship between every two of the plurality of nodes comprises:

determining, by the at least one processor, the logical determining and calculation rule by defining the forecasting object, a step size/frequency, a dimension, and an analysis granularity of the node, configuring, by the at least one processor, an adjustment attribute, a calculation sequence attribute, a forecasting object type, and a forecasting limit of the node, and setting an arrow direction of the directed edge between the nodes.

9. The method according to claim 1, wherein the personalized attribute of the node is further used to set an adjustment attribute, a calculation sequence attribute, a forecasting object type, and a forecasting limit of the node.

10. The method according to claim 8, wherein the adjustment attribute of the node comprises an adjustable or non-adjustable mode; the calculation sequence attribute of the node comprises a sequence of performing logical determining by the node or a sequence of performing calculation by the node; the forecasting object type of the node comprises a calculation-type node, a condition determining-type node, an information-type node, and an algorithm-type node; and the forecasting limit of the node comprises a value range of a parameter.

11. The method according to claim 1, wherein the configuring, by the at least one processor, the common attribute of the first forecasting model based on instantiation configuration information comprises:

setting, by the at least one processor based on the instantiation configuration information, a connection relationship between the first forecasting model and a data source, an input table, and an output table that are local; or setting, by the at least one processor based on the instantiation configuration information, a connection relationship between the first forecasting model and a data source, an input table, and an output table that are remotely invoked.

12. The method according to claim 1, wherein the converting, by the semantic parsing engine, the first forecasting model and the instantiation configuration information into the first computer-executable parsing code comprises:

converting, by the semantic parsing engine, the first forecasting model and the instantiation configuration information into the first computer-executable parsing code by using a javascript object notation (JSON) or extensible markup language (XML) semantic parsing engine.

13. The method according to claim 1, wherein the data source comprises one or a combination of a financial database, a business database, a baseline database, a dimension database, or an external database.

14. The method according to claim 1, wherein the method further comprises: adjusting, by the at least one processor, the common attribute of the first forecasting model, the attribute of the first forecasting path, and the personalized attribute of the node based on the data information obtained through the user interface, to determine a first forecasting model that meets a forecasting requirement.

15. The method according to claim 14, wherein the determining the first forecasting model that meets the forecasting requirement comprises: displaying, by the at least one processor through the user interface, a forecasting data change rate that is of each node and that is affected by adjustment, and determining, by the at least one processor based on the forecasting data that is of the forecasting object and that is expressed by each node in the forecasting dimension, the first forecasting model that meets the forecasting requirement.

16. The method according to claim 1, wherein the first forecasting model is configured with the second calculation rule and/or a third calculation rule, and the second forecasting model is configured with the first calculation rule and/or a fourth calculation rule.

17. The method according to claim 1, wherein the generating, by the at least one processor, the first forecasting model based on the financial or business information obtained through the user interface comprises: connecting, by the at least one processor, the first forecasting model to an output interface of a trained algorithm model to invoke the algorithm model in real time, and combining, by the at least one processor, the algorithm model with the financial or business information obtained through the user interface, to generate a forecasting model.

18. The method according to claim 1, wherein the method further comprises: configuring, by the at least one processor, a permission for the first forecasting model, wherein the permission comprises a permission for a baseline node in the first forecasting model, and a permission for each forecasting path in the first forecasting model and a permission for a forecasting result corresponding to the first forecasting path.

19. An apparatus of engineering forecast and analysis, comprising at least one processor and a semantic parsing engine, wherein the apparatus performs forecasting based on multi-knowledge fusion of financial data or business data, and wherein the at least one processor is configured to perform:

generating a first forecasting model based on financial or business information obtained through a user interface, wherein the first forecasting model expresses a logical determining and/or calculation rule based on a structure of a high-order directed graph and by using a plurality of nodes, attributes of the plurality of nodes and a relationship between every two of the plurality of nodes, and the first forecasting model expresses a first forecasting path through a directed edge between the nodes; and configuring a common attribute of the first forecasting model, an attribute of the first forecasting path, and a personalized attribute of the node based on instantiation configuration information, wherein the common attribute of the first forecasting model is used to set a connection relationship between the first forecasting model and a data source, an input table, and an output table, the attribute of the first forecasting path is used to set a correspondence between the logical determining and/or calculation rule and data, and the personalized attribute of the node is used to set a forecasting object and a forecasting dimension that are expressed by each node, wherein the semantic parsing engine is configured to perform converting the first forecasting model and the instantiation configuration information into a first computer-executable parsing code, and wherein the first parsing code is used to: connect the first forecasting model to the data source, the input table, and the output table in an engineering manner based on the common attribute of the first forecasting model; execute, on the input table of the data source based on the first forecasting path, the logical determining and calculation rule that is expressed by the first forecasting model; and determine forecasting data that is of the forecasting object and that is expressed by each node in the forecasting dimension, and output the forecasting data to the output table or display the forecasting data on the user interface;

generating a second forecasting model based on the financial or business information obtained through the user interface;

configuring a common attribute of the second forecasting model, an attribute of a second forecasting path, and a personalized attribute of a first node based on obtained first instantiation configuration information, and determining, by the at least one processor, a first calculation rule and a second calculation rule;

configuring a linkage relationship between the first calculation rule and the second calculation rule; and converting the first forecasting model and the second forecasting model, the first instantiation configuration information and the second instantiation configuration information, and the linkage relationship between the first calculation rule and the second calculation rule into a second computer-executable parsing code, wherein sequentially connecting, by the second parsing code the first forecasting model and the second forecasting model based on the linkage relationship between the first calculation rule and the second calculation rule, to generate a forecasting operation flow, and storing the forecasting operation flow in a graph database as a high-order directed graph structure.

* * * * *